United States Patent
Sato et al.

(10) Patent No.: US 8,113,957 B2
(45) Date of Patent: Feb. 14, 2012

(54) GAME SYSTEM, SERVER AND TERMINAL

(75) Inventors: Yukihiro Sato, Tokyo (JP); Katsutoshi Yoshida, Tokyo (JP); Masato Miyazaki, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1005 days.

(21) Appl. No.: 12/066,881

(22) PCT Filed: Nov. 8, 2006

(86) PCT No.: PCT/JP2006/322234
§ 371 (c)(1),
(2), (4) Date: Mar. 14, 2008

(87) PCT Pub. No.: WO2007/063683
PCT Pub. Date: Jun. 7, 2007

(65) Prior Publication Data
US 2010/0151947 A1    Jun. 17, 2010

(30) Foreign Application Priority Data
Nov. 30, 2005   (JP) .................................. 2005-346809

(51) Int. Cl.
*A63F 9/24* (2006.01)

(52) U.S. Cl. .......................................... 463/42; 463/43

(58) Field of Classification Search ................ 463/1, 13, 463/40, 41, 42, 43
See application file for complete search history.

(56) References Cited

U.S. PATENT DOCUMENTS

| | | | |
|---|---|---|---|
| 5,586,937 A | 12/1996 | Menashe et al. | |
| 6,095,920 A | 8/2000 | Sadahiro et al. | |
| 6,273,820 B1* | 8/2001 | Haste, III | 463/40 |
| 6,884,172 B1* | 4/2005 | Lloyd et al. | 463/42 |
| 7,004,839 B2* | 2/2006 | Suzuki et al. | 463/42 |
| 7,155,515 B1* | 12/2006 | Brown et al. | 709/226 |
| 2002/0094869 A1* | 7/2002 | Harkham | 463/42 |
| 2003/0217135 A1 | 11/2003 | Chatani et al. | |
| 2004/0018876 A1 | 1/2004 | Kubota et al. | |
| 2004/0242324 A9* | 12/2004 | Walker et al. | 463/40 |
| 2004/0248653 A1* | 12/2004 | Barros et al. | 463/43 |
| 2006/0183526 A1* | 8/2006 | Verardi et al. | 463/13 |
| 2006/0194628 A1* | 8/2006 | Novellie | 463/13 |
| 2007/0060303 A1* | 3/2007 | Govender et al. | 463/25 |

FOREIGN PATENT DOCUMENTS

JP  2001-079273 A  3/2001

(Continued)

*Primary Examiner* — Dmitry Suhol
*Assistant Examiner* — Jason Skaarup
(74) *Attorney, Agent, or Firm* — Edwards Wildman Palmer LLP; Peter C. Schechter; Brian R. Landry

(57) ABSTRACT

A game system allowing a player corresponding to a terminal, from which communication has been cut, to restart the game from the game situation at the moment of communication cut. The server has a game continuation device for continuing the game except the error terminal in a case where the error terminal occurs, and a server restart device for transmitting situation information of each player after communication recovery as information for restart, and restarting the game by communication with only the error terminal. The error terminal comprises a terminal restart device for restarting the game after communication recovery based on the situation information included in the information for restart, and a virtual input operation device for functioning as a virtual player instead of players P corresponding to other terminal.

19 Claims, 21 Drawing Sheets

FOREIGN PATENT DOCUMENTS

| | | |
|---|---|---|
| JP | 2002-273057 A | 9/2002 |
| JP | 2003-053044 A | 2/2003 |
| JP | 2004-057224 A | 2/2004 |
| WO | WO-98/14898 | 4/1998 |
| WO | WO-2004/052483 | 6/2004 |
| WO | WO 2006052213 A1 * | 5/2006 |

* cited by examiner

FIG. 3

| 13 | | |
|---|---|---|
| PLAYER NAME (14) | TERMINAL INFORMATION (15) | PLAY INFORMATION (16) |
| PA | 2a | |
| PB | 2b | |
| PC | 2c | |
| PD | 2d | |

| PLAYER NAME | TERMINAL INFORMATION | PLAY INFORMATION |
|---|---|---|
| PA(PA') | 2d | |
| PB(PB') | 2d | |
| PC(PC') | 2d | |
| PD | 2d | |

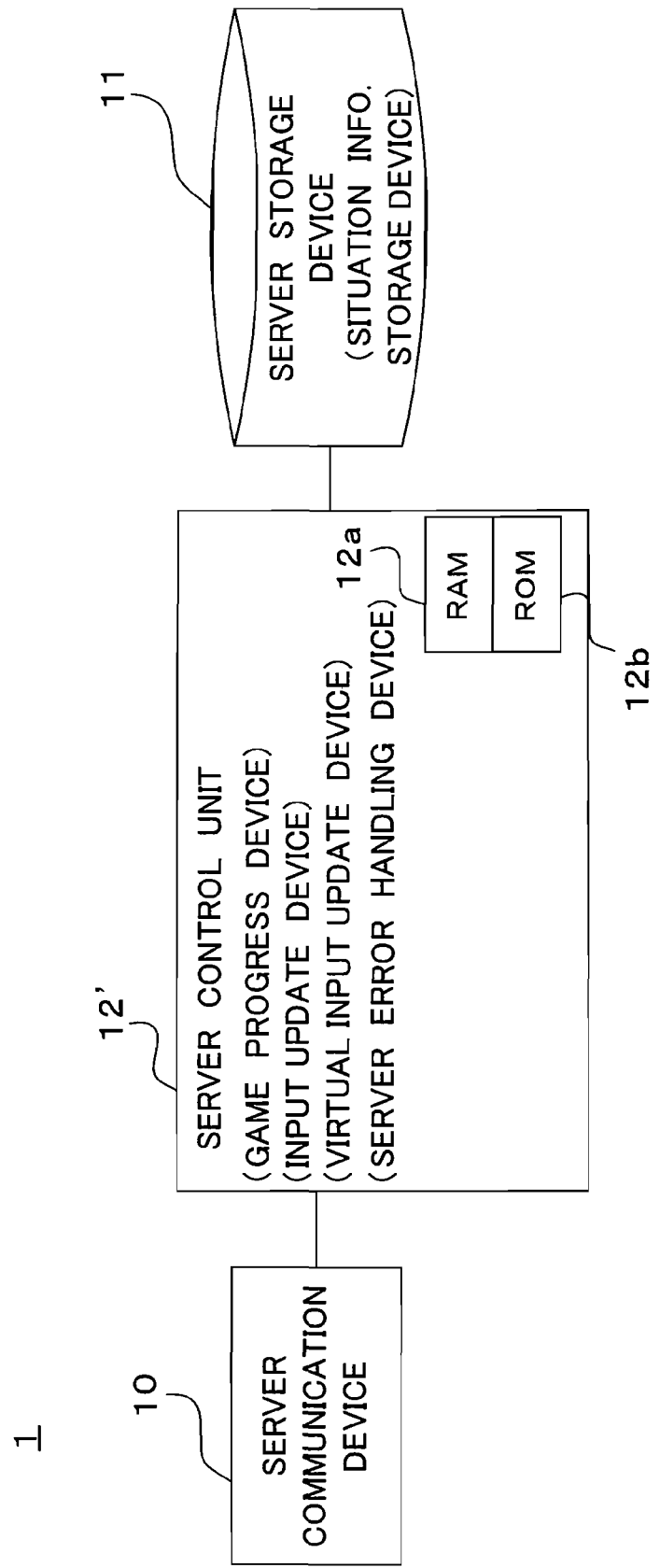

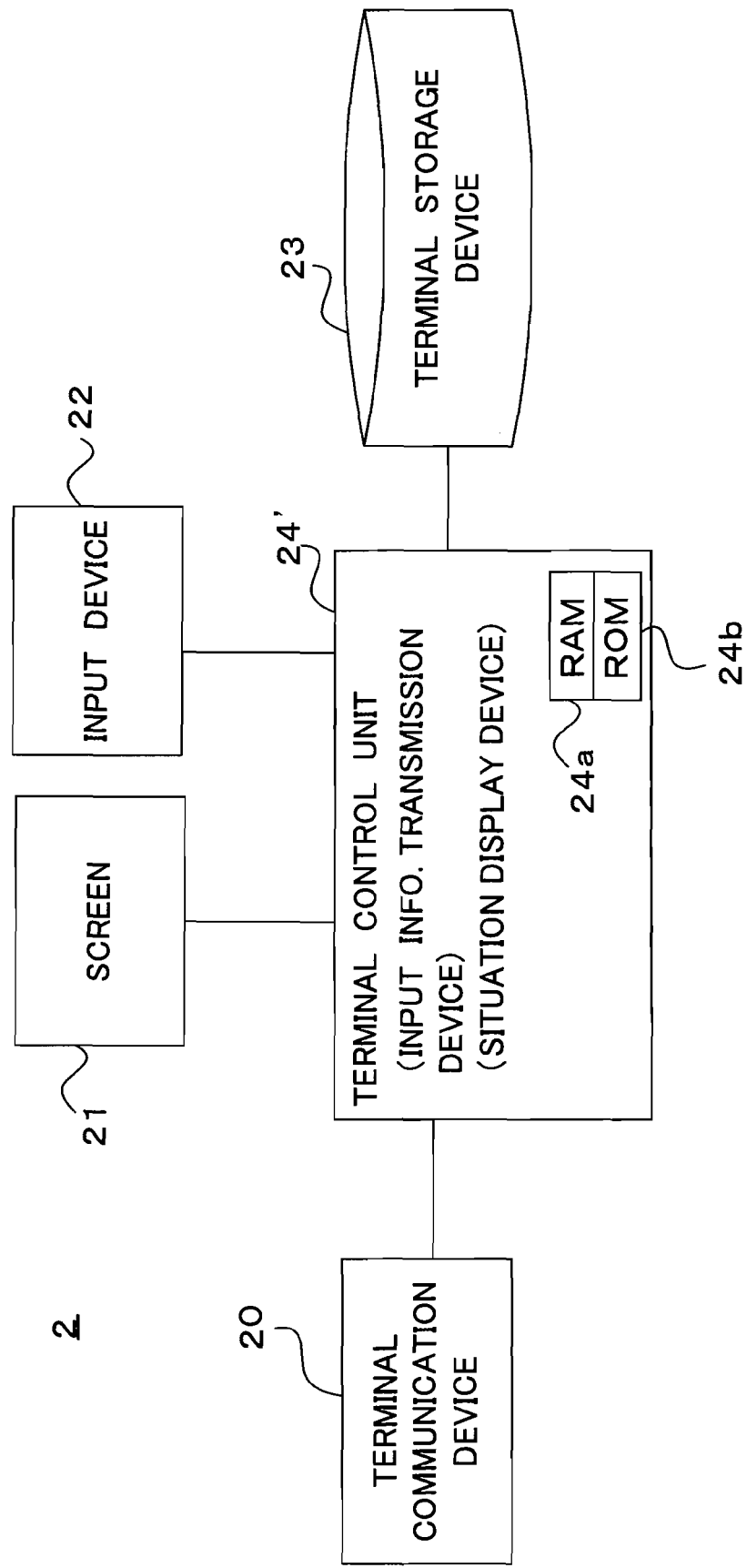

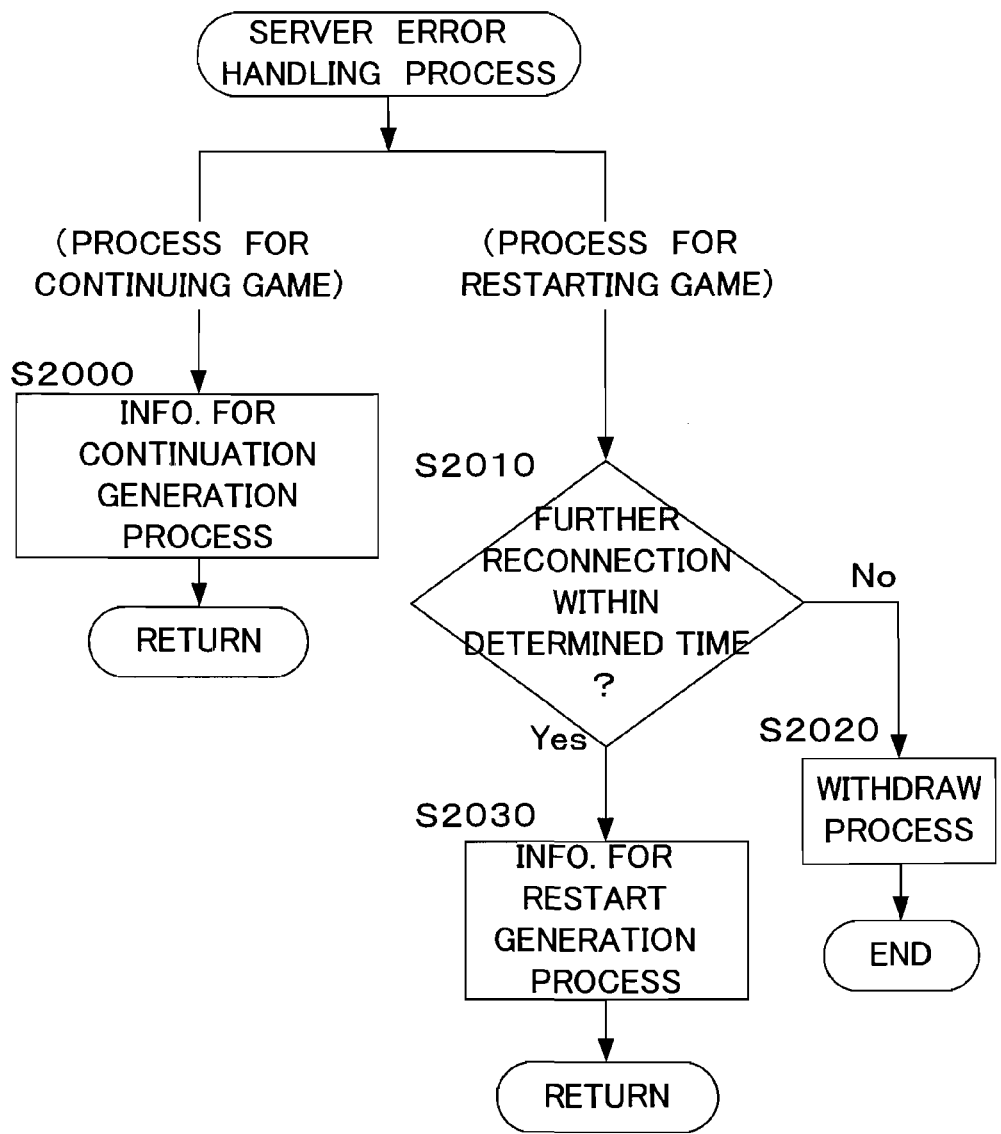

| PLAYER NAME | TERMINAL INFORMATION | PLAY INFORMATION |
|---|---|---|
| PA(PA') | SERVER | |
| PB(PB') | SERVER | |
| PC(PC') | SERVER | |
| PD | 2d | |

GAME SYSTEM, SERVER AND TERMINAL

CROSS REFERENCE TO RELATED APPLICATIONS

This is a U.S. national phase application under 35 U.S.C. §371 of International Patent Application No. PCT/JP2006/322234, filed Nov. 8, 2006 and claims the benefit of Japanese Application 2005-346809, filed Nov. 30, 2005 the contents of both applications are incorporated herein in their entirety. The International Application was published on Jun. 7, 2007 as International Publication No. WO 2007/063683 under PCT Article 21 (2).

TECHNICAL FIELD

The present invention relates to a game system where a game is played among plural terminals via a server, and a server and a terminal therein.

BACKGROUND ART

A game system executed by a server and plural terminals capable of transmitting and receiving data with the server has been already well known. In such a game system, especially using wireless system, a situation that communication between the terminal and the server is stopped often occurs. There is a game system already known, where a game is continued by only normal terminals except a terminal with which the communication is unavailable (hereinafter referred to as "an error terminal") (for example, See, Unexamined patent publication No. 2004-57224). For example, operations by a virtual player are determined by a predetermined method as the operations by a player of the error terminal.

However, in the case that the game is continued only by normal terminals, the game is advanced except the error terminal. Therefore, even if the communication of error terminal recovers, there is a problem of a method how the error terminal rejoins the game. A system is considered, where the situation of a virtual player of the game advanced except the error terminal is set the situation of the player of recovering error terminal. In this case, there is a problem because the situation at the moment of recovering might be a situation the player does not wish.

Therefore, it is an object of the present invention to provide a game system or the like to make a player of a terminal unavailable communication recover from the play situation at the moment of shutting communication.

SUMMARY OF THE INVENTION

The game system of the present invention is a game system having a server; and a plurality of terminals, each capable of transmitting and receiving data with the server, in which a game is implemented via the server among a plurality of players each corresponding to each of the terminals by input operation of the player to the corresponding terminal, wherein the server has: a situation information storage device for storing situation information indicating situation in the game of each player; a situation-information update device for obtaining update information of update of the situation information of each player from each terminal, and updating the situation information by the update information; and a server error handling device for implementing predetermined processes, when it is determined that an error terminal from which communication is cut has occurred among the terminals; the server error handling device having: a game continuation device for continuing except the error terminal the game based on the situation information of each player at a moment of the determination; and a server restart device for, after communication recovery with the error terminal, transmitting to the error terminal information for restart including the situation information of each player corresponding to at least other terminals at the moment of the determination, and restarting only by communicating with the error terminal, the game where the information for restart is used as the situation information; and each of the terminals has: an input operation device for updating the situation information of the player corresponding to the terminal itself which the terminal itself stores, in accordance with the input operation by the player, and transmitting the update information of the update to the server; a virtual input operation device for, in a case where at lease one virtual player is determined, determining a virtual input operation as the input operation by each virtual player in the game, updating the situation information of the virtual player in accordance with the virtual input operation, and transmitting the update information of the update to the server; a situation display device for displaying on a screen situation of each player in accordance with the situation information of the player corresponding to the terminal itself and the update information of the players corresponding to other terminals; and a terminal restart device for, in a case where the terminal itself is the error terminal, setting the situation information of the players corresponding to the other terminals by using the information for restart obtained from the server after the communication recovery, and restarting the game; the terminal restart device activating, as well as the input operation device and the situation display device, the virtual input operation device by setting the virtual players as the players corresponding to the other terminals.

According to the game system of the present invention, in the situation information storage device of the server, the situation information of each of the players joining the game. The situation information in the situation information storage device is always made the latest caused by the situation information update device. Accordingly, when it is determined that the error terminal from which communication is cut has occurred, the situation information at the moment of the determination of error indicates the situations of each of the players at the moment of the determination. By the server restart device, the situation information of each of the players corresponding to at least other terminals at the moment of the determination is transmitted to the error terminal as the information for restart. At the error terminal obtained the information for restart after communication recovery, by the terminal restart device, the situation information of the players corresponding to other terminals included in the information for restart is used as the situation information for restarting the game by the situation display device.

By activating the virtual input operation device as the virtual player to be a player corresponding to the other terminal, the virtual player determines the virtual input operation as the player of the other terminal, and processes are implemented in the same way as the processes based on the input operation of a real player. Thereby, at the error terminal, after the communication recovery, the game can be restated from the game situation at the moment when the communication with server becomes unavailable. Additionally, as the situation information of the player corresponding to the terminal itself is set originally, the situation information can be used as it is.

On the other hand, at normal terminals except the error terminal, the game is continued by the game continuation device. The embodiment of game continued by the game continuation device includes, when number of players joining the game is not specified, a case where the game is continued only by the normal terminals except the player corresponding to the error terminal and a case where the game is continued by setting the virtual player as the player corresponding to the error terminal at the server or the other terminal.

The server error handling device can recognize the error terminal by always checking situation of communication with each terminal. The update information transmitted and received between the server and the terminal includes a case of only information different between before and after update of the situation information, and a case of updated situation information itself. Although it is possible to obtain from the server the update information of the players of other terminals, the update information corresponding to the player of the other terminal set as the virtual player to the terminal itself can be obtained directly. Although at each of the terminals the situation information of the player corresponding to the terminal itself is stored, if the situation information at game start is determined by the server the situation information at game start can be obtained from the server, or if the situation information at game start is determined by each terminal the determined situation information can be set as the situation information at game start. The terminal can be any type of terminal as long as capable of transmitting and receiving data with the server, and includes a case of mobile terminal and a case of fixed terminal.

The information for restart may include the situation information of the player corresponding to the error terminal, and the terminal restart device may set the situation information of the player by the information for restart. Thereby, for example, even though the situation information of the player corresponding to the terminal itself gets erased because of a shortage of power supply of the terminal or the like, it is possible to restart the game at the terminal.

The situation information storage device may store a history of the update information as play history information for each player, the information for restart may include the play history information of each player, and the terminal restart device may determine the virtual input operation in accordance with the play history information. As the update information is information according to the input operation of the player, the play history information of the player can be made from the update information. In the game restarted in the error terminal, all but the player corresponding to the terminal itself are virtual players, but by the play history information of the player corresponding to the virtual player, the virtual input operation can be determined in accordance with the input tendency of the input operation. Accordingly, even though all of the other players are the virtual players, uncomfortable feeling of the player corresponding to the error terminal can be reduced.

The update information may include only information updated to the situation information before update by the input operation or the virtual input operation. Thereby, it is not needed to transmit the situation information of the other terminal to each terminal. It is preferable especially when memory size of the situation information is big or when the terminal is a mobile terminal the memory size of which is limited.

A turn of input operation of each player in the game may be determined by a predetermined method, the server error handling device may have a server error determination device for, in a case where the update information from the player whose turn of input operation comes is not received during a predetermined time determining that the terminal corresponding to the player is the error terminal. In this case, as the turn of input operation is determined, if a terminal from which the update information is not received occurs, the game is stopped at the moment and the contents in the situation information storage device are no more updated. Accordingly, the server error handling device and the terminal restart device can progress their processes based on the moment when a communication cut has occurred as the moment of determination that the error terminal has occurred. For example, the game of the present invention can be a mah-jong game in which the situation information of each of the players is used as the hand of tiles information of the player. The game may be a mah-jong game where the situation information of each player is used as hand of tiles information.

The game continuation device may specify one of the terminals except the error terminal, refer to the situation information storage device to transmit to the specified terminal as information for continuation, the situation information of the player corresponding to the error terminal at the moment of the determination, and obtain the situation information of the player corresponding to the error terminal from the specified terminal, the terminal, when receiving the information for continuation, may set the situation information included in the information for continuation to be the situation information of the virtual player instead of the player corresponding to the error terminal, and set the virtual input operation as the input operation of the player corresponding to the error terminal, for activating the virtual input operation device. Thereby, it is possible to continue the game, the situation of which that the player of the error terminal also joins the game as the virtual player. Especially even if a game is one that the number of players to join the game is determined, the required number of players can be always secured.

A server of the present invention is a server of a game system including the server and a plurality of terminals, each capable of transmitting and receiving data with the server, in which a game is implemented via the server among a plurality of players each corresponding to each of the terminals by input operation of the player to the corresponding terminal, and at the terminal when a virtual player is set as the player corresponding to one of the other terminals, the virtual player is possible to join the game as the player of the one of the other terminals, wherein the server includes: a situation information storage device for storing situation information indicating situation in the game of each player; a situation-information update device for obtaining update information of update of the situation information of each player from each terminal, and updating the situation information by the update information; and a server error handling device for implementing predetermined processes, when it is determined that an error terminal from which communication is cut has occurred among the terminals; the server error handling device having: a game continuation device for continuing except the error terminal the game based on the situation information of each player at a moment of the determination; and a server restart device for, after communication recovery with the error terminal, transmitting to the error terminal information for restart including the situation information of each player corresponding to at least other terminals at the moment of the determination, and restarting only by communicating with the error terminal, the game where the information for restart is used as the situation information. It is possible to make the server of the present invention activate as the server in the game system of the present invention.

A terminal of the present invention is a terminal of a game system including a server and a plurality of terminals, each capable of transmitting and receiving data with the server, in which a game is implemented via the server among a plurality of players each corresponding to each of the terminals by input operation of the player to the corresponding terminal, and at the server situation information indicating situation in the game of each player is stored, wherein the terminal has: an input operation device for updating the situation information of the player corresponding to the terminal itself which the terminal itself stores, in accordance with the input operation by the player, and update information of the update transmitting to the server; a virtual input operation device for, in a case where at lease one virtual player is determined, determining a virtual input operation as the input operation by each virtual player in the game, updating the situation information of the virtual player in accordance with the virtual input operation, and transmitting update information of the update to the server; a situation display device for displaying on a screen situation of each player in accordance with the situation information of the player corresponding to the terminal itself and the update information of the players corresponding to other terminals; and a terminal restart device for, in a case where the terminal itself is an error terminal, setting the situation information of the players corresponding to the other terminals by using information for restart obtained from the server after the communication recovery, and restarting the game; the terminal restart device activating, as well as the input operation device and the situation display device, the virtual input operation device by setting the virtual players as the players corresponding to the other terminals. It is possible to make the terminal of the present invention as the terminal in the game system of the present invention.

The next game system of the present invention is a game system having a server; and a plurality of terminals, each capable of transmitting and receiving data with the server, in which a game is implemented via the server among a plurality of players each corresponding to each of the terminals by input operation of the player to the corresponding terminal, wherein the server has: a situation information storage device for storing situation information indicating situation in the game of each player; a game progress device for progressing the game based on the situation information of each player; an input update device for, when obtaining input information of input operation of each player from each terminal, updating the situation information by the input information, and transmitting update information of the update to each terminal; a virtual input update device for, in a case where at least one virtual player is set, determining virtual input operation instead of the input operation in the game of each virtual player, updating the situation information of the virtual player in accordance with the virtual input information, and transmitting update information of the update to each terminal; a server error handling device for implementing predetermined processes, when it is determined that an error terminal from which communication is cut has occurred among the terminals; the server error handling device having: a game continuation device for continuing except the error terminal the game based on the situation information of each player at a moment of the determination; and a server restart device for, after communication recovery with the error terminal, by setting the virtual player as the player corresponding to one of the terminals except the error terminal to activate the virtual input operation device, restarting the game only by communication with the error terminal; and the terminal has: an input information transmitting device for transmitting to the server the input information of input operation of the player corresponding to the terminal itself; and a situation display device for displaying on a screen situation of each player in accordance with the update information obtained from the server.

According to the second game system of the present invention, the situation information of each player is consolidated by the server, and each situation information is updated in accordance with the input information of the player. In a case where it is determined that the error terminal from which communication is cut has occurred, for the terminals except the error terminal, the game based on the situation information at the moment of the determination is continued by the game continuation device. On the other hand, for the error terminal, by the server restart device, after communication recovery, the game based on the situation information at the moment of the determination is restarted. In the game to be restarted, the players of the other terminals are set as the virtual players in order to activate the virtual input update device.

Thereby, each terminal has only to activate the input information transmitting device and the situation display device to continue the game at the terminals except the error terminal. At the error terminal after the communication recovery, the situation at the moment of the determination that the error terminal has occurred is reproduced to restart the game with the virtual players as the players corresponding to the other terminals. For example, the moment of the determination could be the moment of the communication cut, by always monitoring whether the error terminal has occurred. Accordingly, for the player of the error terminal from which the communication is cut, it is possible to provide the game to restart from the game situation at the moment of communication cut. The situation information at the moment of the determination to be used by the game continuation device and the server restart device may be obtained by copying the situation information at the moment of the determination as the situation information for at least one of the game continuation device and the server restart device.

As mentioned above, according to the present invention, while the game being continued for the terminals except the error terminal, based on the situation of each of the players at the moment of communication cut, after the communication recovery for the error terminal, the game based on the situation information of each of the players at the moment of communication cut, is restarted with the virtual players instead of the players corresponding to the other terminals. Thereby, it is possible to provide a game system and the like which can recover the game from the game situation at the moment of communication cut, for the player corresponding to the terminal where communication is cut.

BRIEF DESCRIPTION OF DRAWINGS

FIG. 3 is a diagram showing game information in the embodiment shown in FIG. 1.

FIG. 13B is a diagram showing game information for restart.

FIG. 14 is a schematic diagram of a hardware construction of the server in another embodiment.

FIG. 15 is a schematic diagram of a hardware construction of the mobile terminal in the other embodiment.

FIG. 19 is a flow chart showing a flow of a server error handling process in the other embodiment.

FIG. 20A is a diagram showing game information for continuation in the other embodiment.

FIG. 20B is a diagram showing game information for restart in the other embodiment.

DETAILED DESCRIPTION OF THE INVENTION

Figure 1:
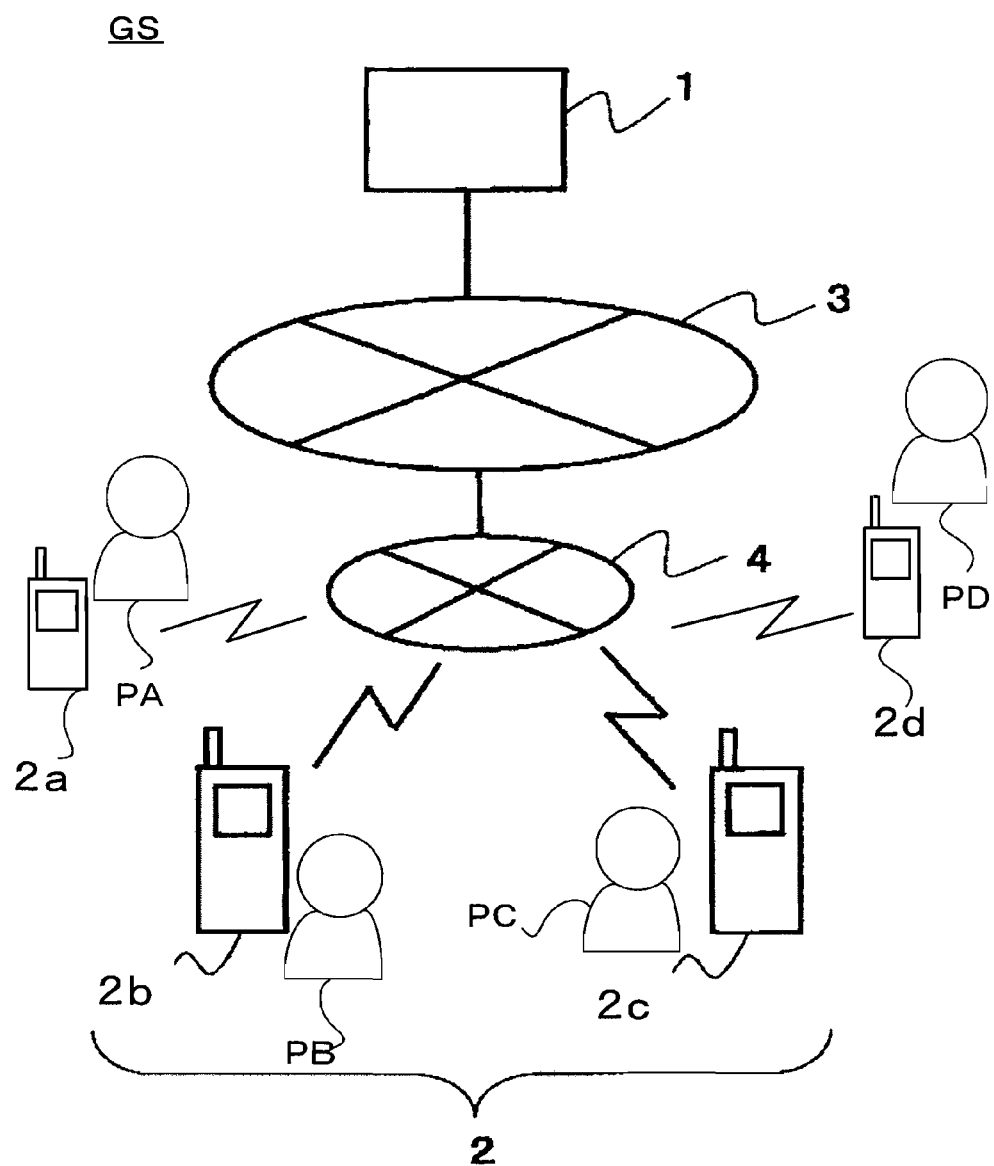
FIG. 1 is a diagram showing an example of a game system of the present invention.

FIG. 1 is a diagram showing one example of a game system GS for an embodiment of the present invention. The game system GS of the present invention is constituted by a server 1, four mobile terminals 2a, 2b, 2c, 2d each capable of transmitting and receiving data with the server 1. Hereinafter, when it is not necessary that each of the mobile terminals 2a . . . 2d is distinguished, each of them is referred to as "the mobile terminal 2". The mobile terminal 2 of this embodiment is a mobile type phone. The server 1 and the mobile terminal 2 are connected via the internet 3 and a network 4 for the mobile type phone.

In the game system of this embodiment, a mah-jong game is played by the four mobile terminals 2. Hereinafter, the mah-jong game in this embodiment is sometimes called as only the game. The mobile terminal 2a, the mobile terminal 2b, the mobile terminal 2c and the mobile terminal 2d are operated by a player PA, a player PB, a player PC and a player PD respectively. Hereinafter, when it is not necessary that each of players PA, PB, PC and PD is not distinguished, each of players PA, PB, PC and PD is referred to as "player P".

Figure 2:
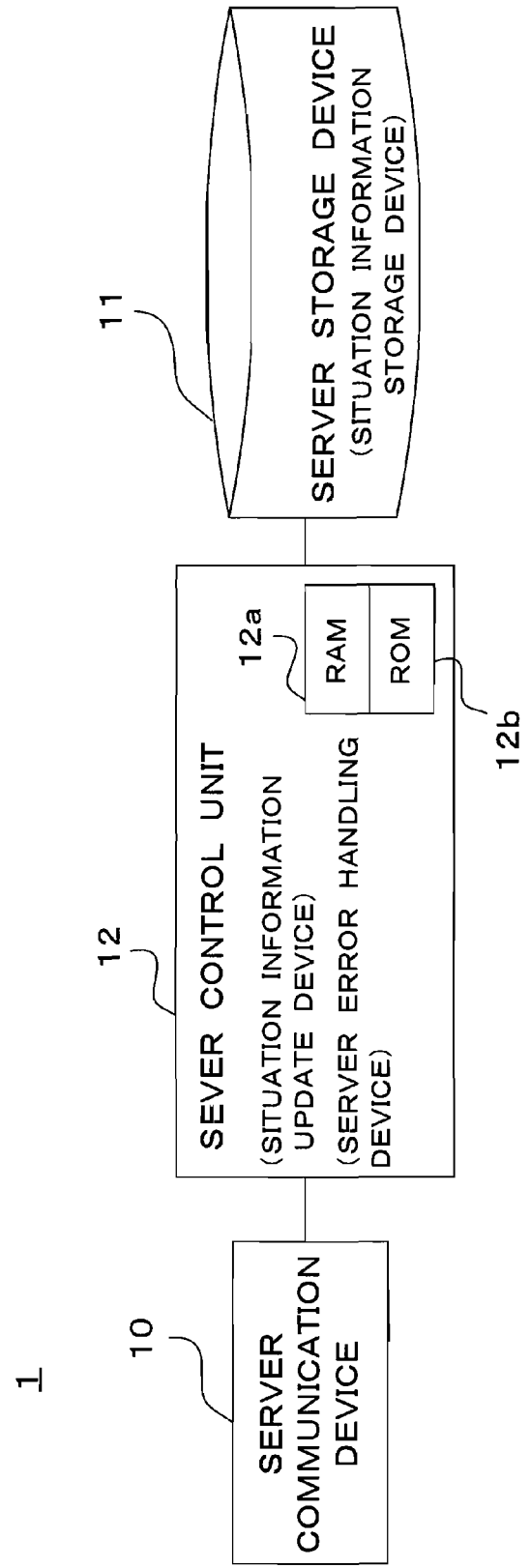
FIG. 2 is a schematic diagram of a hard ware construction of a server in an embodiment.

The construction of the server 1 is showed in FIG. 2. The construction of the server 1 may be a conventional one. The server 1 comprises a server communication device 10 for transmitting and receiving data, a server storage 11 for storing various kinds of data used in the game such as game information and stockpile data both mentioned later, a server control unit 12 for processing various kinds of data and controlling operations of each construction element 10, 11.

The server control unit 12 is constructed as a computer having a CPU and various kinds of peripheral circuits necessary for operations of the CPU such as a RAM 12a and a ROM 12b. The server control unit 12 functions mainly as a situation-information update device and a server error handling device. In the case where an error terminal incapable of communication occurs, the server error handling device handles processes for the communication error. Additionally, the ROM 12b stores the program for realizing the present invention, for example.

The game information 14 stored in the server game storage 11 as situation information storage device will be described. The data construction of the game information 13 is as showed in FIG. 3, that is, player name 14, player information 15 and play information 16 are related with each other for each player P. The terminal information 15 is information for identifying the mobile terminal 2 operated by each player P. When the server 1 transmits and receives data with player P indicated by the player name 14, executes the transmission and reception with the mobile terminal 2 associated in the game information 13. Play information 16 includes private hand of tiles information of player P as the situation information of player P and play history information of player P. The play history information is constituted by a history of the play result information. The play result information will be described later.

In this embodiment, hand of tiles information means information of tiles relating to the player, for example, discard tiles, FURO tiles, and Tsumo tile are included. The game information 13 of the present invention indicates that a player PA, a player PB, a player PC and a player PD are participating in the game. For example, a terminal 2a and player information of the player PA are associated with the player PA. Much the same is true on the other players PB, PC, PD.

Figure 4:
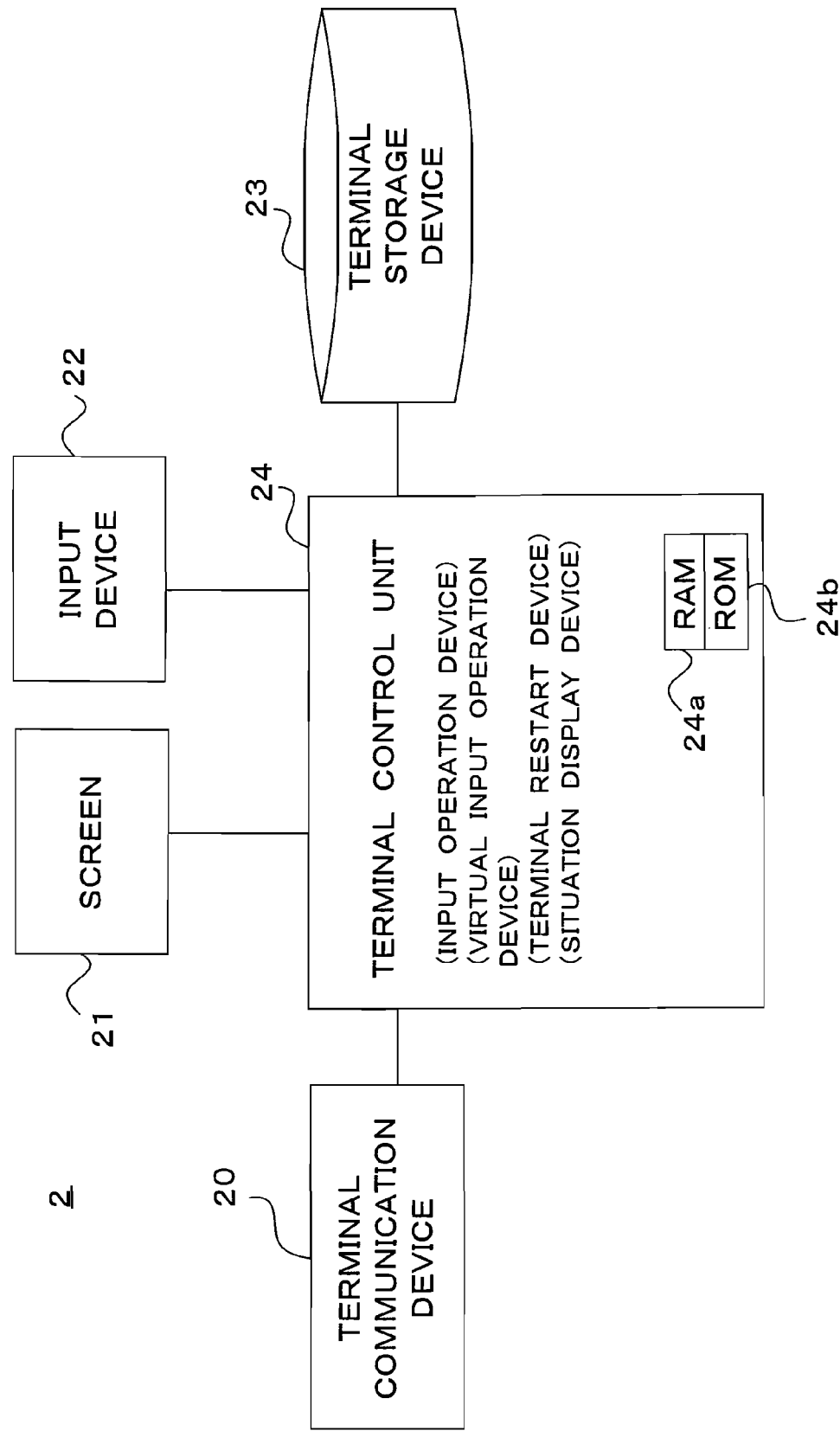
FIG. 4 is a schematic diagram of a hard ware construction of a mobile terminal in the embodiment.

A hardware construction of mobile terminal 2 is shown in FIG. 4. The mobile terminal 2 comprises a terminal communication device 20 for transmitting and receiving data with the server 1, a screen 21 for displaying a game screen to display game situation, an input device 23 for accepting input operations of player P, a terminal storage device 23 for storing various kinds of data necessary to execute the present invention, and a terminal control unit 24 for controlling operations of each constructing element 20, 21, 22 and 23 by processing various kinds of data. The terminal control unit 24 is constructed as a computer having a CPU and various kinds of peripheral circuits such as RAM 24a and ROM 24b required for the operations of the CPU. The terminal control unit 24 mainly functions as an input operation device, a virtual input operation device, a situation display device and a terminal restart device.

The input operation device implements processes relating to the input operations by a real player operating the mobile terminal. The virtual input operation device, when a virtual player different from the real player operating the mobile terminal (hereinafter referred to as "the virtual player") is determined, determines virtual input operations for the virtual player and implements similar processes to which are implemented when the input operation is performed by a player. The terminal restart device, when the terminal itself is an error terminal, implements processes for restarting the game after communication recovery. In the ROM 24b, for example, programs for realizing the present invention are stored.

Figure 5:
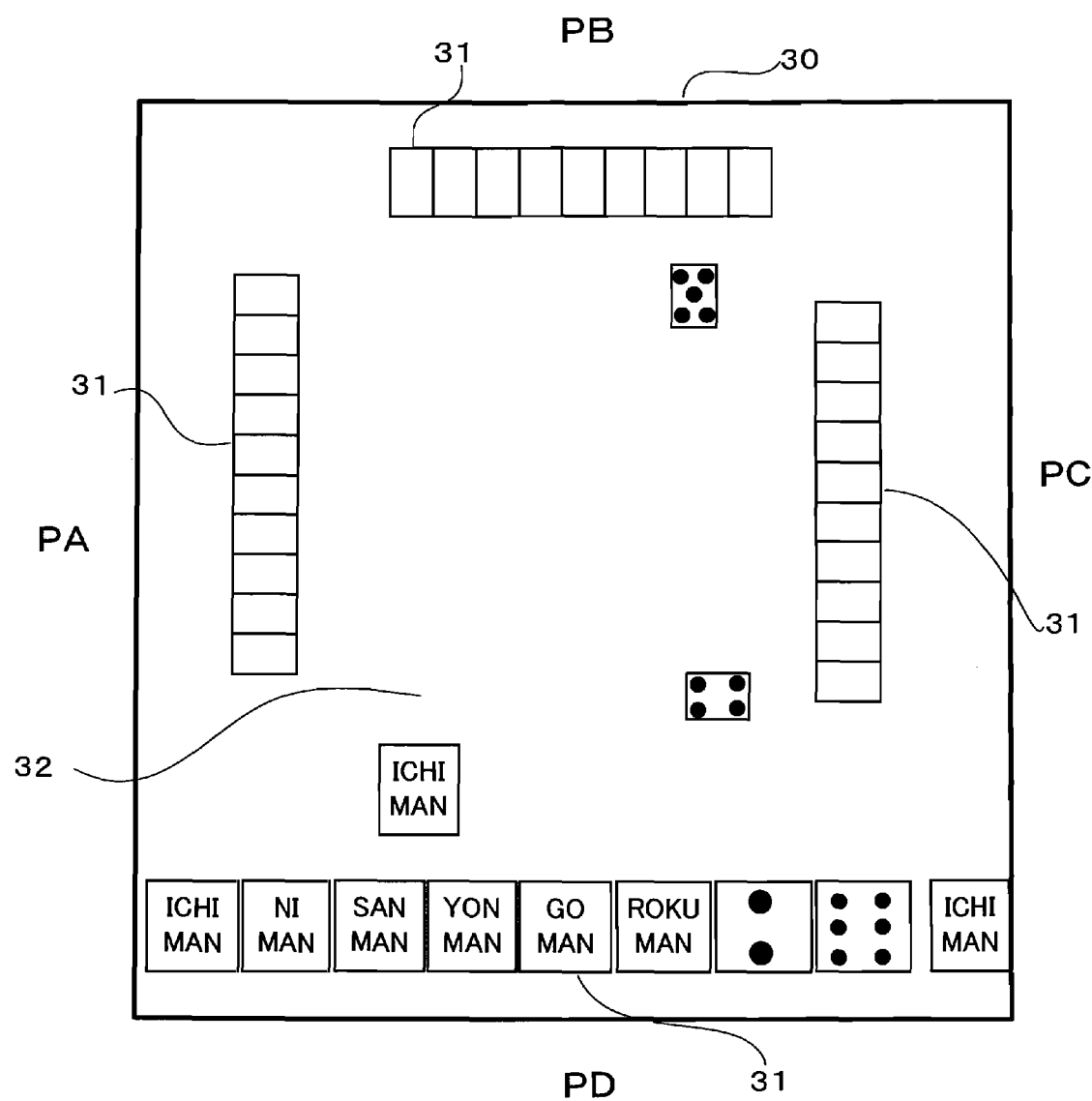
FIG. 5 is a diagram showing an example of a game screen of the mobile terminal shown in FIG. 1.

Next, progress procedures generally performed in the game will be described. During the game, a game screen 30 as shown in FIG. 5, for example, is displayed on the screen 21 of the mobile terminal 2d operated by the player PD. The game screen 30 is constructed by an image looking like a table for mah-jong. The front side of the game screen 30 is a position of the player PD, and the game screen 30 is displayed so that the hand of tiles and the Tsumo tile of the player PD can be recognized. In the game screen 30 of the present embodiment, the positions of the player PD, the player PA, the player PB and the player PC are respectively assigned clockwise. The game screen 30 comprises a hand of tiles area 31 and a discard tiles area 32 for each player P. Also, on the screen 21 of each mobile terminal 2a, 2b, 2c, a game screen similar to the game screen 30 is displayed so that the hand of tiles and the Tsumo tile of only the corresponding player P can be recognized.

Figure 6:
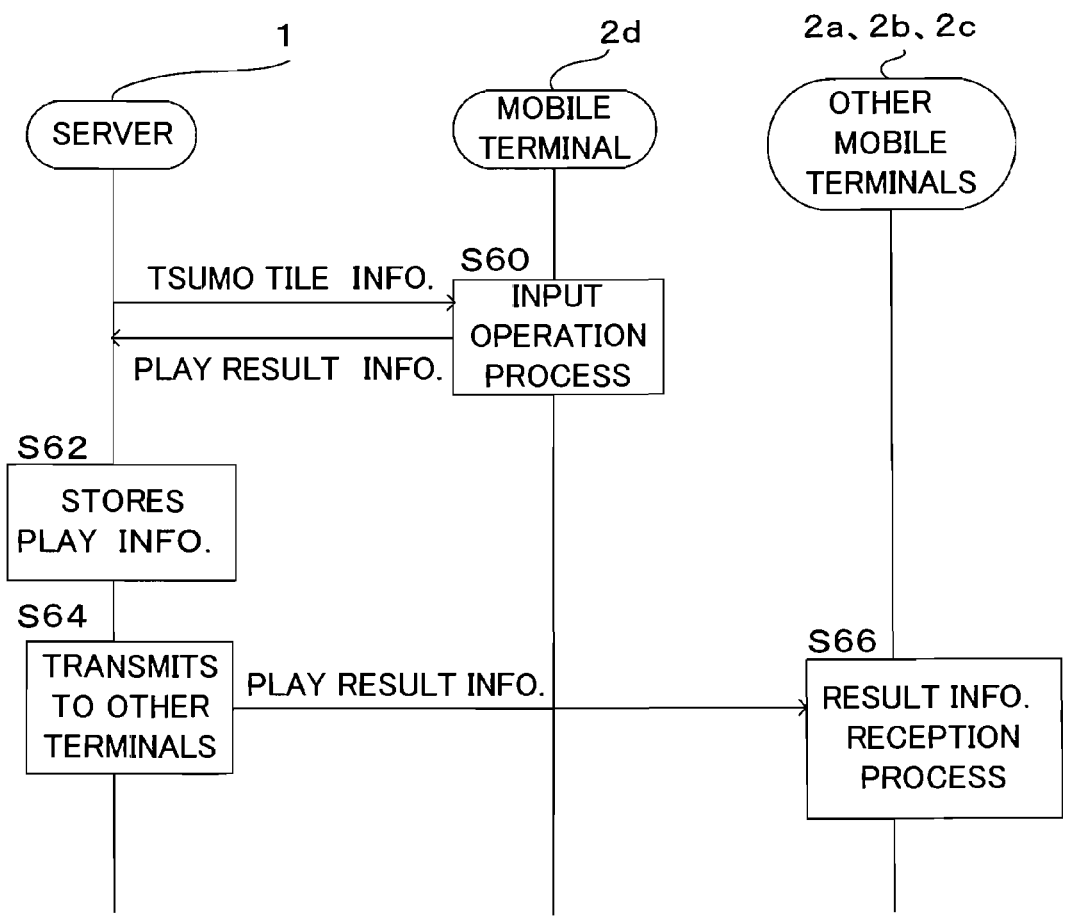
FIG. 6 is a sequence diagram showing the procedure of processes of the server and the terminal mobile in the embodiment.

As the game of this embodiment is a mah-jong game, a turn to perform input operation for the player P is determined by a predetermined method. For example, a schematic procedure of processes in the case that the turn of player PD operating the mobile terminal 2d comes and the player PD is going to perform the input operation will be described in reference to a sequence diagram shown in FIG. 6. In the terminal storage device 23 of the mobile terminal 2d, the present hand of tiles information of the player PD is set as the situation information. First, at step S60, Tsumo tile information transmitted from the server 1 is received. When the input operation is performed to the mobile terminal 2d by the player PD, input operation process is implemented at the mobile terminal 2d. The Tsumo tile information is information of Tsumo tile provided from the server 1. The Tsumo tile information is stored in the play information 16 of the player PD at the moment of transmission of the server 1.

In the input operation process, the hand of tiles information of the player PD is updated in accordance with the input operations, and play result information as update information of the update is transmitted to the server 1. Moreover, the game screen 30 is updated in accordance with the hand of tiles information of the player PD. Next, at step S62, when receiving the play result information from the mobile terminal 2d, the server 1 stores the play result information in the play information 16 of the player PD. At the moment, the play result information is stored as the play history information, and updates the hand of tiles information.

Next, the server 1 transmits the play result information received at step S64 to the mobile terminals 2a, 2b, 2c corresponding to the players PA, PB, PC respectively except the player PD. At step S66, at the mobile terminal 2 having received the play result information, result information reception process is implemented based on the play result information. In the result information reception process, the game screen 30 is updated so that image where the received play result information is reflected is displayed. That is, the game screen 30 where the play result information of the player PD is reflected is displayed at each of the mobile terminals 2a, 2b, 2c. As mentioned above, the play result information in the present embodiment is information to be used to make the game screen 30 at each of the other mobile terminals updated, while being stored as the play history information.

For example, at the turn of player PD, in the case that the Tsumo tile determined by the server 1 is a tile of "kyu-man", the server stores this Tsumo tile information in the player information 16 of the player PD and transmits the Tsumo tile information to the mobile terminal 2d. In the case that the player PD performs the input operation for discarding a tile of "ni-man" from his/her hand of tiles, the information that the player PD discards the tile of "ni-man" is generated as the play result information. Moreover, the game screen 30 is updated in accordance with the input operation. The play result information is transmitted to the server 1.

The server 1 updates the hand of tiles of the player PD by the play result information, stores the play result information in the play history information of the play information 16 of the player PD, and transmits the play result information to the mobile terminals 2a, 2b, 2c of the other players. At each of the mobile terminals 2a, 2b, 2c having received the play result information, the tile of "ni-man" is displayed in the discard area 32 of the game screen 31 in accordance with the received play result information. After that, the input operations of each player P is performed in a predetermined sequence, the processes similar to the above mentioned are implemented at each mobile terminal 2 and the server 1.

Figure 7A:
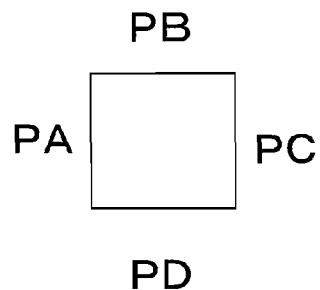
FIG. 7A is a conceptual diagram showing the situation of game before occurrence of communication error.
Figure 7:
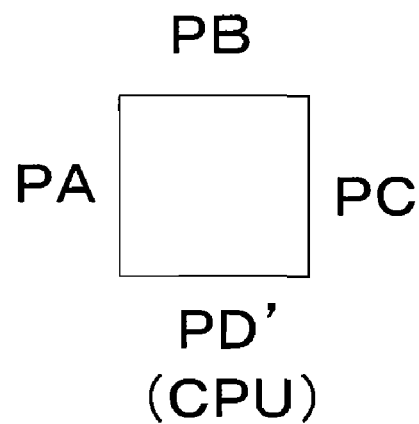
FIG. 7B is a conceptual diagram showing the situation of game after occurrence of communication error.
FIG. 7C is a conceptual diagram showing the situation of game after occurrence of communication error.
Figure 7:
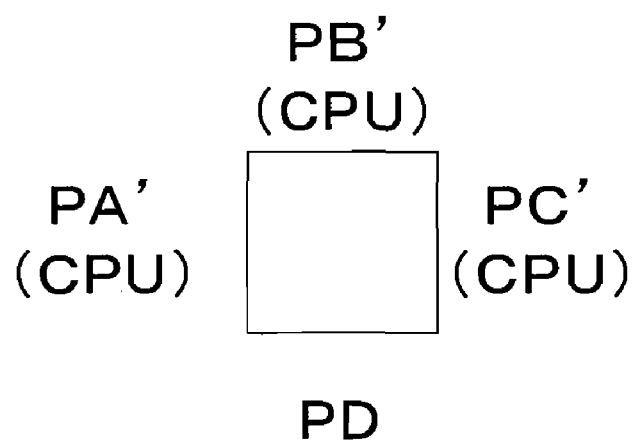

In the game system GS, in the case where the communication between the server 1 and the mobile terminal 2 is cut to be unavailable, the processes for handling a communication error are implemented. For example, the case where, in the game ongoing by the players PA, PB, PC, PD, the communication error occurs at the mobile terminal 2d operated by the player PD will be described. FIG. 7A shows the situation that the mah-jong game is progressing by the player PA, the player PB, the player pc and the player PD before the communication error.

When the communication error occurs at the mobile terminal 2d, as shown in FIG. 7B, the ongoing game is continued by the players PA, PB, PC except the player PD operating the mobile terminal 2d where the communication error has occurred. In this case, instead of the player PD, the terminal control unit 24 of any one of the mobile terminals 2a, 2b, 2c functions as the player PD. Accordingly, after the communication error occurs, the player PD in the continued game is not a real player, but a virtual player PD' controlled by the terminal control unit 24.

In the meanwhile, at the mobile terminal 2d where the communication error has occurred, the game is stopped. However, when the mobile terminal 2d is reconnected, as shown in FIG. 7C, the player PD can restart the game with virtual players PA', PB', PC' controlled by the terminal control unit 24 of the mobile terminal 2d. In this case, the game situation at the moment of restarting the game is the same as the game situation of the moment when the communication at the mobile terminal 2d has been cut. That is, the player PD can restart the game from the situation of the moment when the communication at his/her mobile terminal 2d has been cut.

By setting the virtual players P' as players P of the other mobile terminal, the terminal control unit 24 of the mobile terminal 2 functions as the virtual input operation device. The schematic progress procedures of the game in the case where the virtual player P' is set will be described, as referring the case where the real player PA of the other mobile terminal is set as the virtual player PA' at the mobile terminal 2d operated by the player PD and the other mobile terminals 2b, 2c are existing. During the game, on the screen 21 of the mobile terminal 2d of the player PD, the game screen 30 shown in FIG. 5 already mentioned is displayed. That is, only the tiles based on the hand of tiles information of the player PD can be recognized.

Figure 8:
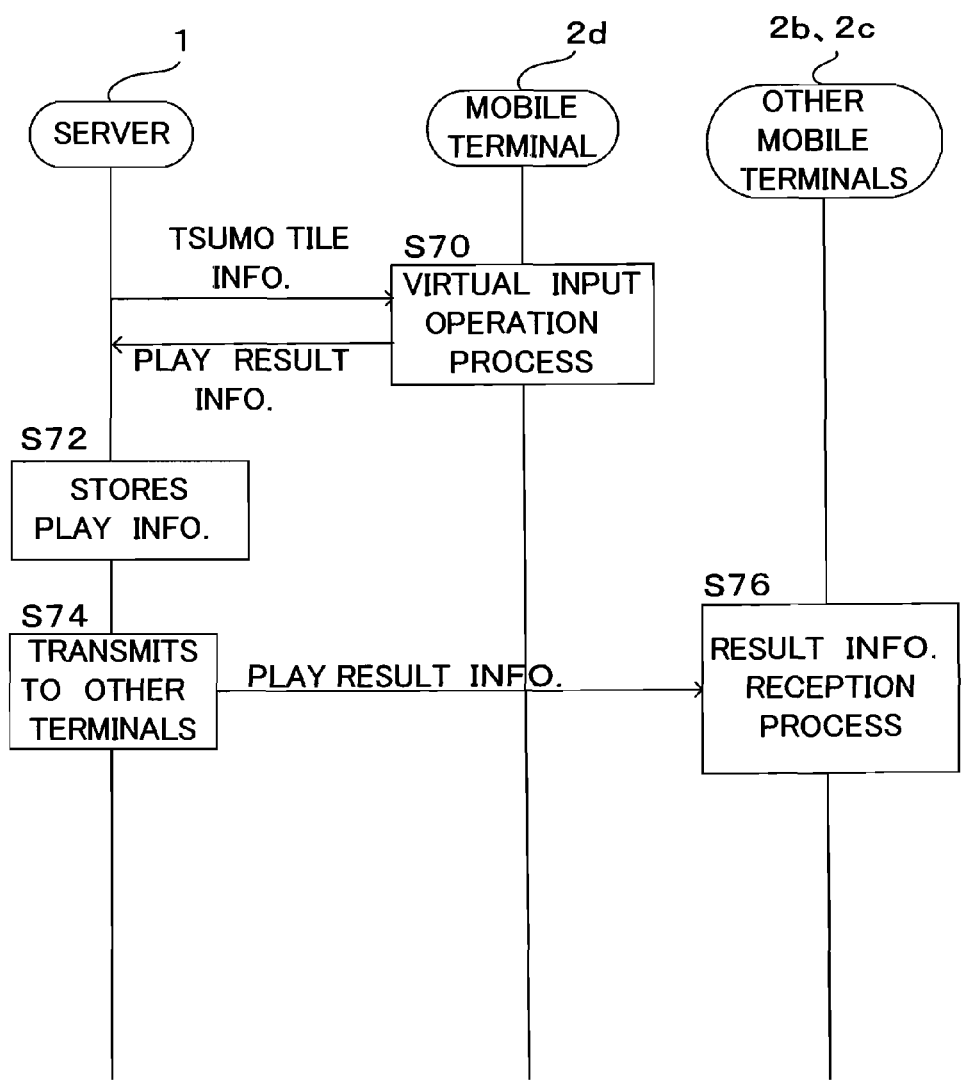
FIG. 8 is a sequence diagram showing the procedure of processes of the mobile terminal and the server in a case where the virtual player is set in the embodiment.

The case where the turn of input operation comes to the virtual player PA' will be described as referring a sequence diagram shown in FIG. 8. The turn of the virtual player PA' is the same as the turn of the player PA actually existing (hereinafter referred to as "the real player PA"). In the terminal storage device 23 of the mobile terminal 2d, the play information 16 of the player PA and the hand of tiles information of the virtual player PA' are set. First, at step S70, when the Tsumo tile information from the server 1 is received, a virtual input operation process caused by the virtual player PA' who's turn for input operation has come is implemented. The server 1 stores the Tsumo tile information in the play history information of the play information 16 of the real player PA.

In the virtual input operation process, a virtual input operation of the virtual player PA' is determined first. In this case, the virtual input operation is determined according to a tendency of play in reference to the play history information of the player PA. The hand of tiles information of the virtual player PA' is updated according to the virtual input operation, and the play result information as the update information of the update is transmitted to the server 1 as the play result information of the real player PA. Moreover, the game screen 30 is updated to display an image where the update information is reflected. Next, at step S72, when receiving the play result information from the mobile terminal 2d, the server 1 stores the play result information in the play history information of the play information 16 of the real player PA, and updates the hand of tiles information of the play information 16 according to the play result information.

Next, the server 1, at step S74, transmits the play result information to the other mobile terminals 2b, 2c except the mobile terminal 2d which is a source of sending the play result information. At step S76, at the mobile terminals 2b, 2d having received the play result information, result information reception process is implemented based on the play result information. In the result information reception process, the game screen 30 is updated to reflect the play result information into the image. That is, at each of the mobile terminals 2b, 2c, the game screen 30 where the play result information is reflected is displayed.

For example, at the turn for the virtual player PA', in the case where the server 1 determines that the Tsumo tile is a tile of "yon-man", the server 1 stores this Tsumo tile information in the play history information of the play information 16 of the real player PA, and transmits the Tsumo tile information to the mobile terminal 2d. In the case where the virtual input operation is determined to discard the Tsumo tile of "yon-man", the play result information indicating the operation is generated to be transmitted to the server 1. Additionally, caused by the play result information, the tile of "yon-man" is displayed in the discard tiles area 32 of the game screen 30. The server 1 stores the received play result information in the play history information of the real player PA and updates the hand of tiles of the player PA. Moreover, the play result information is transmitted to the mobile terminals 2b, 2c of the other players by the server 1. At each of the mobile terminals 2b, 2c having received the play result information, based on the received play result information, the tile of "yon-man" is displayed in the discard tiles area 32 of the game screen 30.

Figure 9:
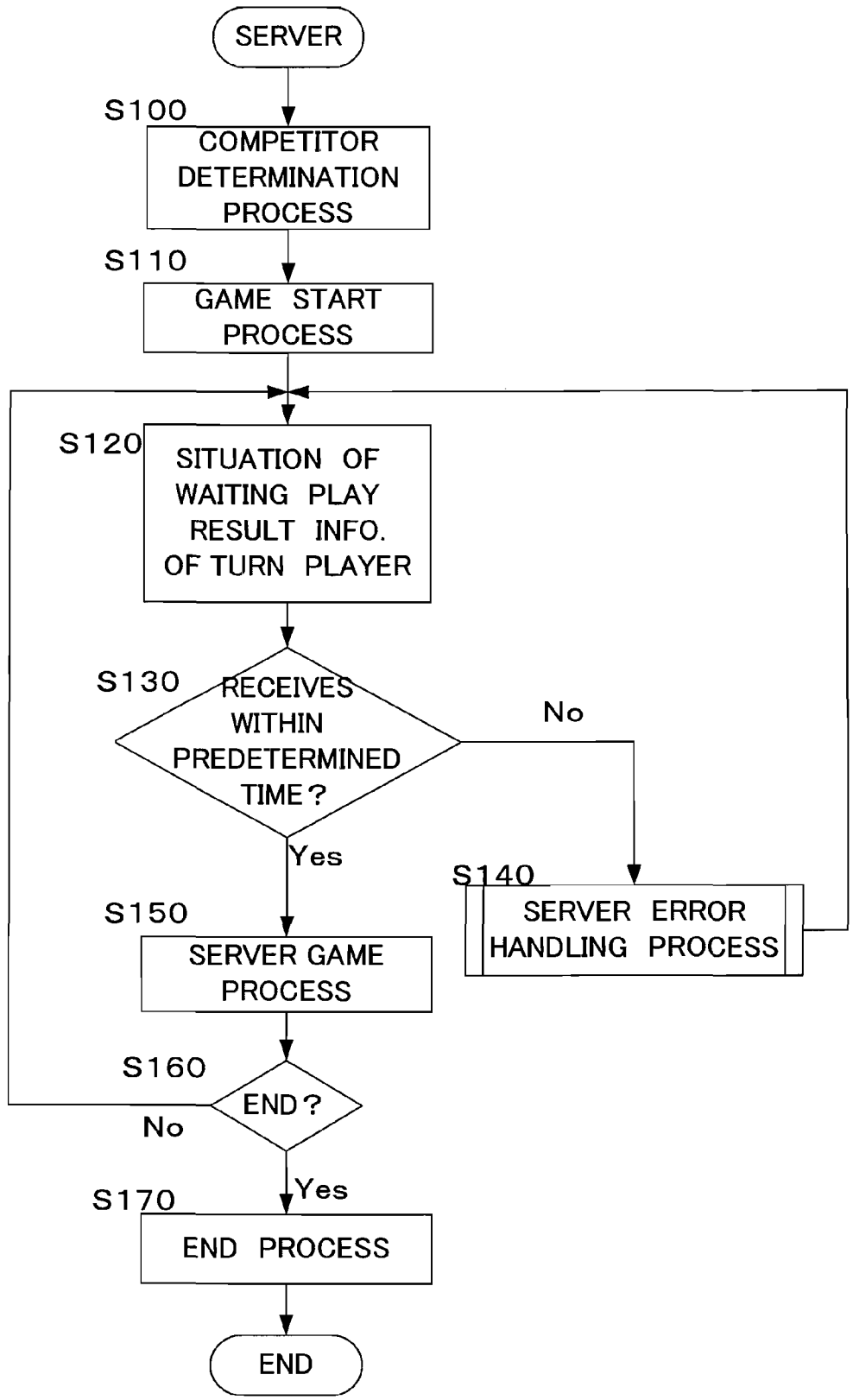
FIG. 9 is a flow chart showing the flow of processes implemented at the server in the embodiment.
Figure 10:
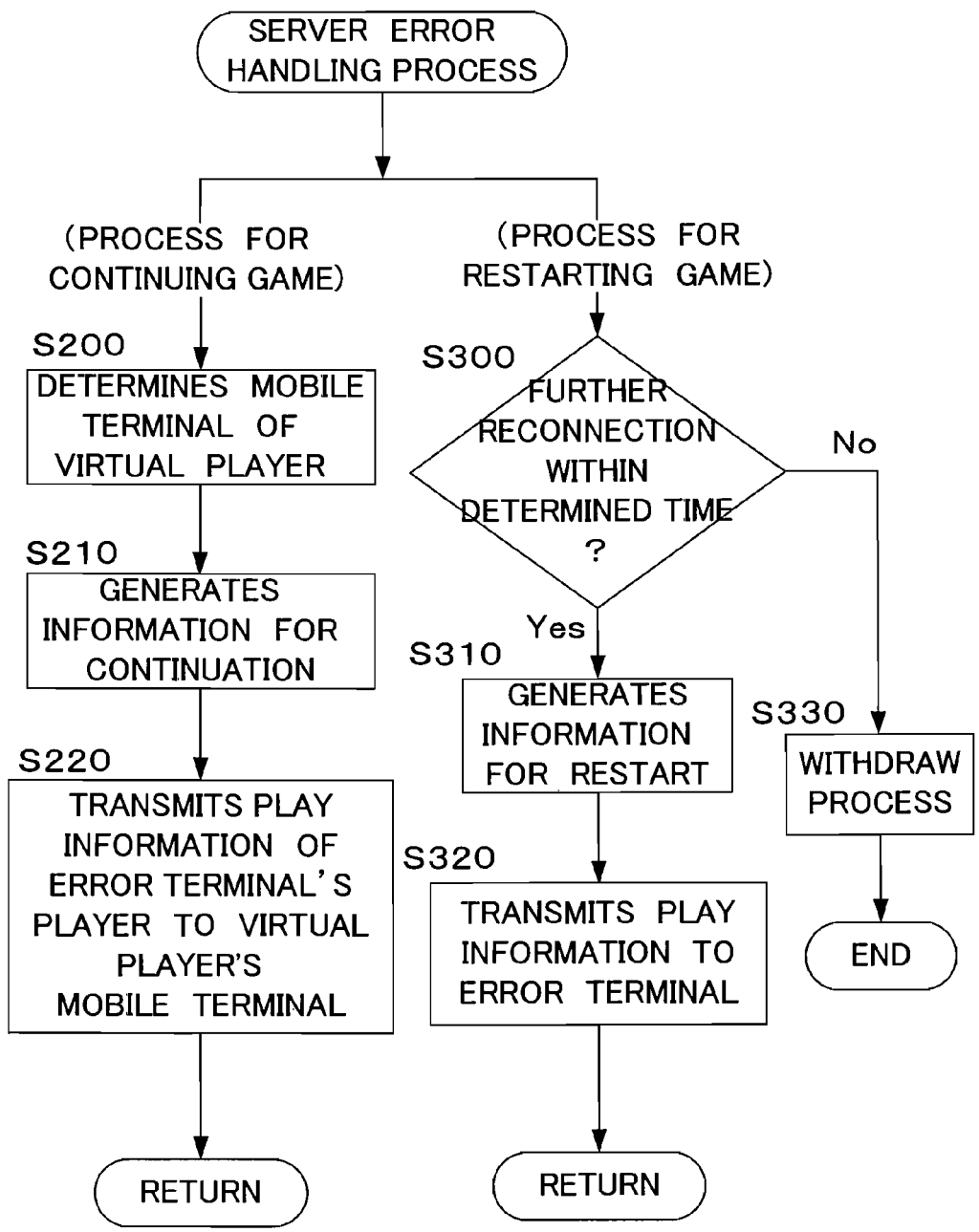
FIG. 10 is a flow chart showing a flow of a server error handling process in the embodiment.

Hereinafter, the processes to be implemented at each of the server 1 and the mobile terminal 2 in the game system GS will be described. First, the processes implemented at the server 1 will be described in reference to flow charts shown in FIGS. 9 and 10. Each of the processes included in the flow charts shown in FIGS. 9 and 10 is implemented by the sever control unit 12 of the server 1. The server 1 first implements a competitor determination process at step 100. In the competitor determination process, four players P are grouped as competitors. The method for grouping players P may be the method for a conventional communication game system. In the present embodiment, the case where the player PA, the player PB, the player PC and the player PD are grouped as the competitors will be described.

Figure 3:
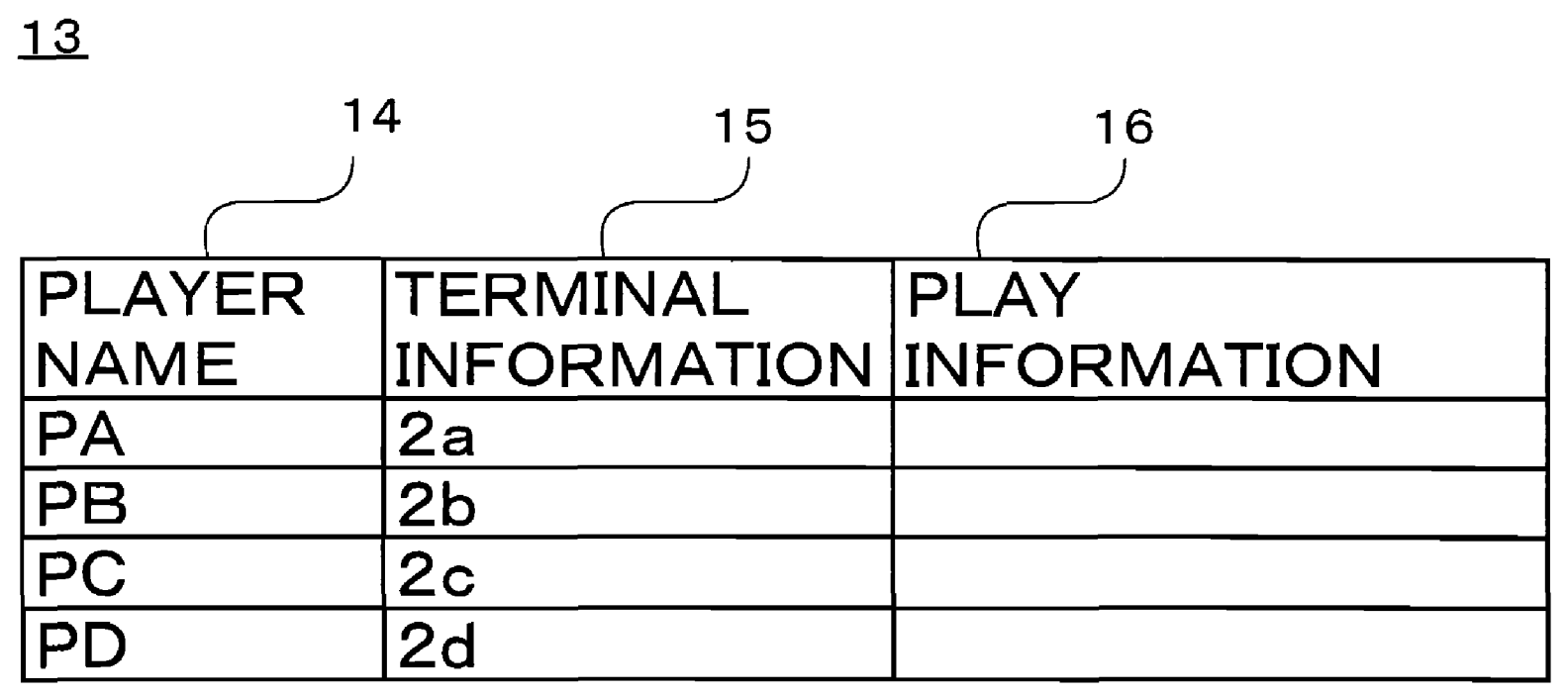

Hereinafter, one group of the players P grouped as the competitors is referred to as "a table player". When the table player is determined, the game information 13 about the table player is generated. That is, the player names 1 and mobile terminal information 15 of each player P included in the table player is set. Consequently, the game information 13 shown in FIG. 3 is generated. The game information 13 is generated for each table player. Accordingly, an identification number, for example, is given to the game information 13 for identifying the table player corresponding to the game information 13.

After the game information 13 is set, the procedure goes to step S110 to implement a game start process. In the game start process, first, turns for each player P to play are determined. In the present embodiment, the player PA, the player PD, the player PC and the player PB play in this order. The server 1 has the stock pile data which is data of all tiles possible to be used in the game, and determines the first hand of tiles for each player P based on the stock pile data. The server 1 transmits to the mobile terminal 2 for each player P, an instruction to start the game and first assigned tiles data indicating the hand of tiles determined as the first hand of tiles. Additionally, the server 1 stores the first assigned tiles data of each player P in the play history information corresponding to the player P.

When the first assigned tiles data is transmitted to each player P and the game starts, the procedure goes to step S120, and the server 1 becomes a situation of waiting the play result information from the player P, the turn for play of whom has come (hereinafter referred to as "the turn player P"). The turn player P may be determined by registering the players P in the play information 13 in the orders of playing, for example. At the moment of the situation of waiting reception, the server 1 transmits to the turn player P, data of the Tsumo tile selected form the stock pile as the Tsumo tile information.

Next, at step S130, the server 1 determines whether the play result information gets received from the turn player P within a predetermined time or not. When it is determined that the play result information is not received within the predetermined time, it is determined that the communication with the mobile terminal 2 of the turn player P is cut, and the procedure goes to a server error handling process at step S140. The server error handling process will be described later. In the case where the play result information is not received at step S130, the play information 16 of the game information 13 is not updated any more. Accordingly, in the server error handling process, the game play information 16 of the game information 13 is used in the situation that the play information 16 is not updated by the play result information of the turn player P, that is, the situation at the moment of the communication cut.

Hereinafter, process implemented by the server 1 except the server error handling process is sometimes referred to as "the server normal process". In the case where it is determined that the play result information gets received within the predetermined time from the turn player P at step S130, the procedure goes to step S150 and a server game process is implemented. In the server game process, as mentioned above, the received play result information is stored in the play history information and, while the hand of tiles information being updated, the play result information is transmitted to the mobile terminals 2 of the other players P.

After the server game process, at step S160 it is determined whether the game gets end or not. That may be determined based on conditions of game end that have been set in advance. At step S160, if it is determined that the game does not end, the procedure returns to step S120 and the server gets into the situation for waiting receiving the play result information of the next turn player P. At step S160, it is determined that the game gets end, the procedure goes to step S170 to implement an end process. In the end process, for example, the win or loss of game is determined based on the play information 16, and win-loss result data is generated and transmitted to each player P.

The server error handling process will be described in accordance with a flow chart shown in FIG. 10. In the server error handling process, a process for restarting the game for a mobile terminal 2 where a communication cut has occurred and a process for continuing the game for a mobile terminal 2 where a communication cut has not occurred are implemented. Hereinafter, the case where the communication cut occurs at the mobile terminal 2d of the player PD (hereinafter referred to as "the error terminal 2d") will be described. First, the process for continuing the game will be described. In the process for continuing the game, at step S200, any one of the mobile terminals 2a, 2b, 2c except the error terminal 2d is determined as the mobile terminal 2 where to determine the virtual input operation instead of the player PD. The terminal control unit 24 of the determined mobile terminal 2 determines the virtual input operation instead of the player PD.

Accordingly, after the communication error occurs to the player PD, the player PD in the game to be continued is not the real player PD, but the virtual player PD'. In this embodiment, the case where the terminal control unit 24 of the mobile terminal 2a is determined as the virtual player PD' will be described.

Figures 12, 13A:
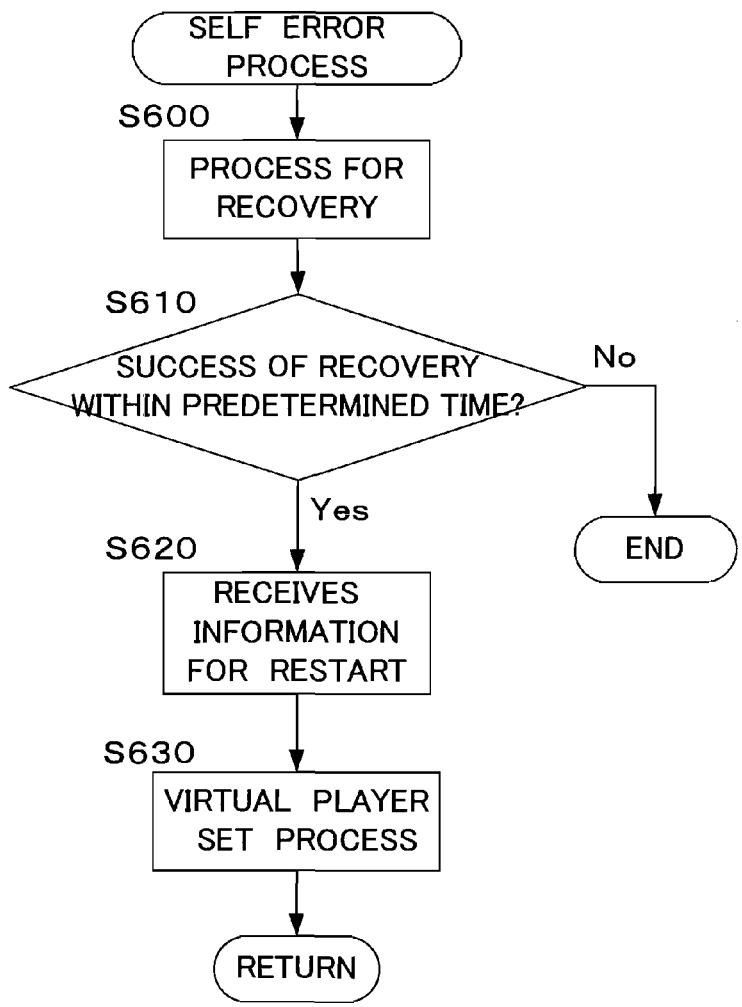
FIG. 12 is a flow chart showing a flow of an own error process.
FIG. 13A is a diagram showing game information for continuation in the embodiment.

Next, at step S210, game information for continuation 131 is generated from the game information 13 at the moment of communication cut of the error terminal 2d. The game information for continuation 131 has the same contents as the game information 13 except the terminal information 15 of the virtual player PD' is newly set. In the case of the present embodiment, as shown in FIG. 13A, the terminal information 15 of the virtual player PD' in the game information 13 is set to be the mobile terminal 2a. Thereby, the server 1 implements the communication with the mobile terminal 2a for implementing the communication with the virtual player PD' in the game. After the game information for continuation 131 is generated, at step S220, the play information 16 of the player PD is transmitted to the mobile terminal 2a.

After transmitting the play information 16 of the player PD, the procedure returns to step S120 in the normal process and the game is continued where the game information for continuation 131 is used as the game information. At step S120, the server 1 gets into the situation for waiting the play result information of the virtual player PD'. Thereby, the server control unit 12 functions as the game continuation device.

The process for restarting the game will be described. In the process for restarting the game, at step S300, it is further determined whether the error terminal 2d gets reconnected or not within a predetermined time. For example, if the serial number information of the error terminal 2 is received, it is determined that means reconnection. In the case where it is determined the error terminal 2d gets reconnected, the procedure goes to step S310 to generate game information for restart 132 from the game information 13 at the moment of the communication cut. The game information for restarting 132 has the same contents as the game information 13 except the terminal information 15 of each of the players PA, PB, PC other than the player PD of the error terminal 2d. In the game information for restart of the present embodiment, as shown in FIG. 13B, the terminal information 15 of each of the players PA, PB, PC is set to be the error terminal 2d. Thereby, the server 1 communicates with the mobile terminal 2d to communicate with all of the players P constituting the table player.

Next, the procedure goes to step S320. The server 1 refers to the game information for restart 132 and transmits to the error terminal 2d as information for restart, the play information 16 of all players P. Thereby, play histories of all players are transmitted to the error terminal 2d. After transmitting the information for restart, the procedure returns to step S120 of the normal process and the server 1 gets into the situation for waiting receiving the play result information of the player PD. Thereby, the game where the game information for restart 132 is used as the game information is restarted. As mentioned above, the server control unit 12 functions as the server restart device.

Meanwhile, at step S300, in the case where the reconnection has not been done within a predetermined time, the server 1 presumes that the player PD has withdrawn and the procedure goes to step S330 for a withdraw process to be implemented. In the withdraw process, for example, in the game continued by the process for continuing the game, a process for treating the player PD to withdraw the game is implemented.

Figure 11:
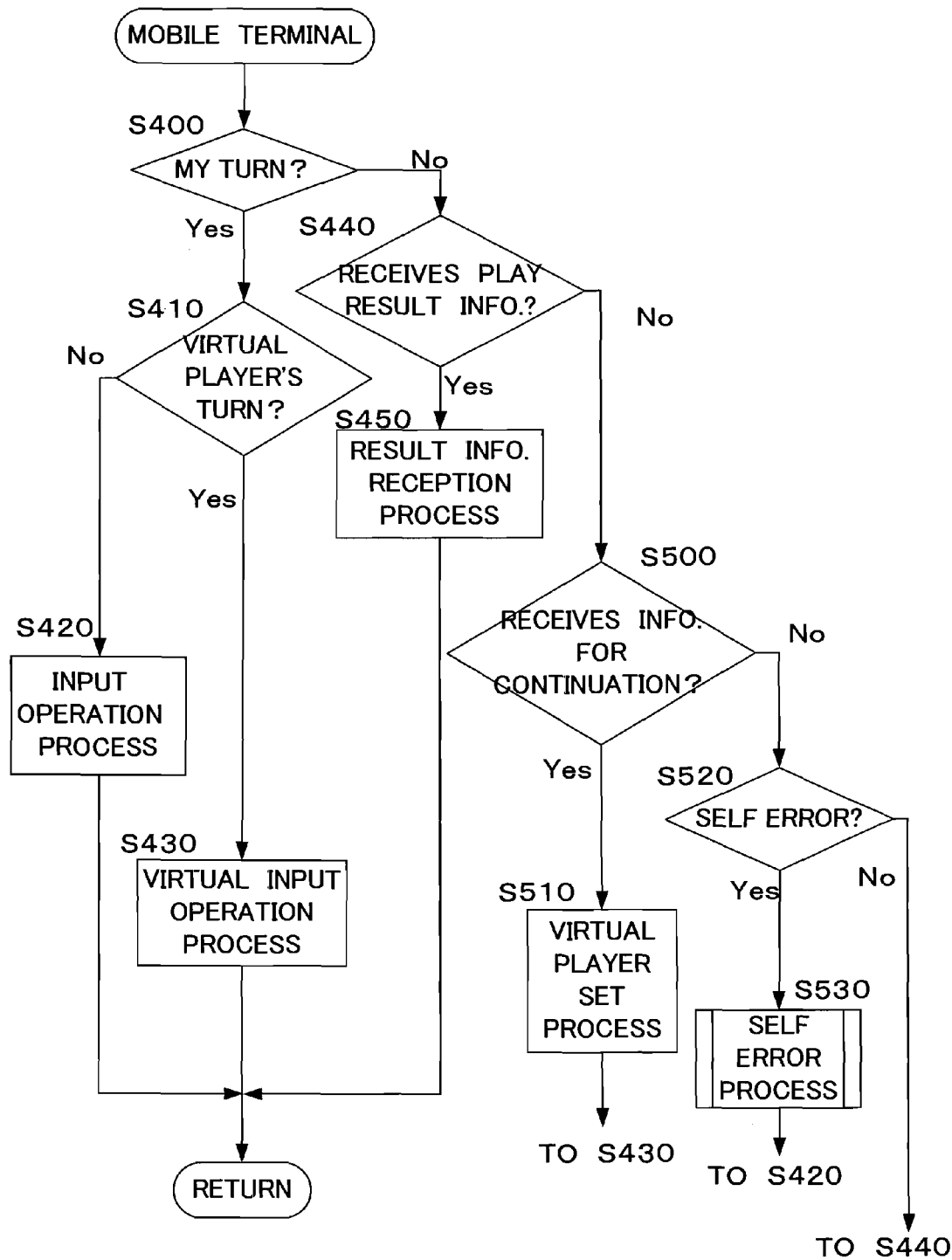
FIG. 11 is a flow chart shoeing a flow of processes implemented at the mobile terminal in the embodiment.

Next, the processes implemented at the mobile terminal 2 will be described in accordance with flow charts shown in FIG. 11 and FIG. 12. Each of the processes is controlled by the terminal control unit 24. As mentioned above, the virtual player P' in the present embodiment is set as an alternate of the player P of the other terminal. Hereinafter, a player who actually exists is referred to as a real player P, in contrast to the virtual player P. First, at step S400, it is determined whether the turn to play for the terminal itself has come or not, that is, whether the turn to play for the real player P of the terminal itself or for the virtual player P has come or not. For example, the mobile terminal 2 can be constructed to determine whether the turn to play for the terminal itself has come by itself, or by information from the server 1.

In the case where the virtual player P' is set to the terminal itself, when the turn for the virtual player P' or the turn for the real player P has come, it is determined that the turn for self has come. In the case that it is determined that the turn for self has come at step S400, the procedure goes to step S410 to determine whether the turn is for the virtual player P' or not. In the case that it is determined that the turn for the virtual player P' has not come, the procedure goes to step S420 to implement the input operation process for the real player P. In the input operation process, the terminal control unit 24 functions as the input operation device. As mentioned above, when the input operation is performed by the real player P, based on the input operation the game screen 30 is updated, and the play result information is generated and transmitted to the server 1.

At step S410, when it is determined that the turn for the virtual player P' has come, the procedure goes to step S430 to implement virtual input operation process. In the virtual input operation process, the terminal control unit 24 functions as the virtual input operation device. As mentioned above, the virtual input operation is determined by the virtual player P7 instead of the input operation by the real player P of the other terminal. In accordance with the virtual input operation, the hand of tiles information and the game screen 30 are updated. The information of the update is transmitted to the server 1 as the play result information. The play result information in the virtual input operation process is transmitted to the server 1 as the play result information of the real player P corresponding to the virtual player P'.

When it is determined that the turn for self has not come at step S400, the procedure goes to step S440 to determine whether the play result information has been received from the server 1 or not. The play result information received from the server 1 is the play result information transmitted from the other terminal to the server. In the case where it is determined that the play result information has been received, the procedure goes to step S450 to implement result information reception process. As mentioned above, in the result information reception process, the game screen 30 is updated in accordance with the received play result information. It is determined that the play result information has not been received at step S440, the procedure goes to step S500 to handle the case that the communication error occurs at the terminal itself or the other terminal.

At step S500, it is determined whether the information for continuation has been received or not. In the case where the information for continuation has been received, the procedure goes to step S510 to implement virtual player set process. For example, in the case where the communication error occurs at the mobile terminal 2d of the real player PD, when the terminal itself receives the information for continuation at the moment of the situation for waiting the play result information of the real player PD, it means the terminal itself has been determined as a mobile terminal 2 of the virtual player PD'. The information for continuation has the play information 16 of the real player PD by the process for continuing the game mentioned above. In the virtual player set process, the hand of tiles information of the virtual player P' is obtained from the play information 16, and is set as the hand of tiles information of the virtual player PD' and the virtual input operation device 24 gets activated.

Accordingly, after the virtual player set process, the procedure goes to the virtual input operation process of step S430 to get into the situation for waiting the virtual input operation of the virtual player PD'. Thereby, for example, in the case where the terminal itself is the mobile terminal 2a, the terminal control unit 24 of the mobile terminal 2a functions as the player PD', and thereby the game is continued by only the other mobile terminals 2a, 2b, 2c except the mobile terminal 2d. Additionally, in the virtual input operation process, the play result information by the virtual player PD' is transmitted to the sever 1 as the play result information of the real player PD.

In the case where it is determined that the information for continuation is not received at step S500, the procedure goes to step S520 and it is determined whether the communication error has occurred at the terminal itself. In the case where it is determined that the communication with the server 1 has been cut by an already-known method, it is determined that the communication error has occurred at the terminal itself. When it is determined that the communication error has occurred at the terminal itself, the procedure goes to step S530 to implement self error process for restarting the game. The self error process will be described later. After the self error process ends, as the game gets restarted the procedure goes to the input operation process of step S420, and gets into the situation of waiting the input operation of the real player P of the error terminal 2. In the case of the present embodiment, in the case that it is determined that the communication error does not occur at the terminal itself at step S520, as that means the situation of waiting receiving the play result information, the procedure returns to step S440.

The self error process will be described according to a flow chart shown in FIG. 12. First, a process for recovering the communication is implemented at step S600, and it is determined whether the communication has successfully recovered or not within a predetermined time at step S610. In the case that it is determined that the communication has successfully recovered, the procedure goes to step S620 to get into the situation for waiting receiving information for restart, and receives the information for restart. When the terminal itself is operated by the real player PD, the information for restart includes the play information 16 of the real player PA, the real player PB, and the real player PC. The received play information 16 is stored in the terminal storage device 23.

Next, virtual player set process is implemented at step S630. In the virtual player set process, the terminal control unit 24 is set to function as the virtual player PA', the virtual player PB' and the virtual player PC' acting as the real player PA, the real player PB and the real player PC respectively. This set process is implemented based on the play information 16 included in the information for restart.

Namely, the hand of tiles information in the play information 16 of each real player PA, PB, PC is obtained from the information for restart and set as the hand of tiles information of the virtual player PA', PB', PC' respectively. Additionally, the hand of tiles information of the real player PD is also set in reference to the hand of tile information in the play information 16 of the real player PD included in the information for restart. Then, the game screen 30 according to each hand of tiles information is displayed. By implementing from step S610 to step S630, the terminal control unit 24 functions as the terminal restart device. Meanwhile, at step S610, when it is determined that the communication cut has not successfully recovered within the predetermined time, the game gets ended.

Next, another embodiment of the present invention will be described. The game system GS in this embodiment has the server 1 and the mobile terminal 2 like the above embodiment. However, the server control unit 12' of the server 1 functions as the virtual player. Hereinafter, only different parts from the first embodiment will be described. As shown in FIG. 14, the server control unit 12' of the server 1 mainly functions as a game progress device, an input update device, a virtual input update device, and a server error handling device. The terminal control unit 24' of the mobile terminal 2 mainly functions as an input information transmitting device and a situation display device, as shown in FIG. 15.

Figure 16:
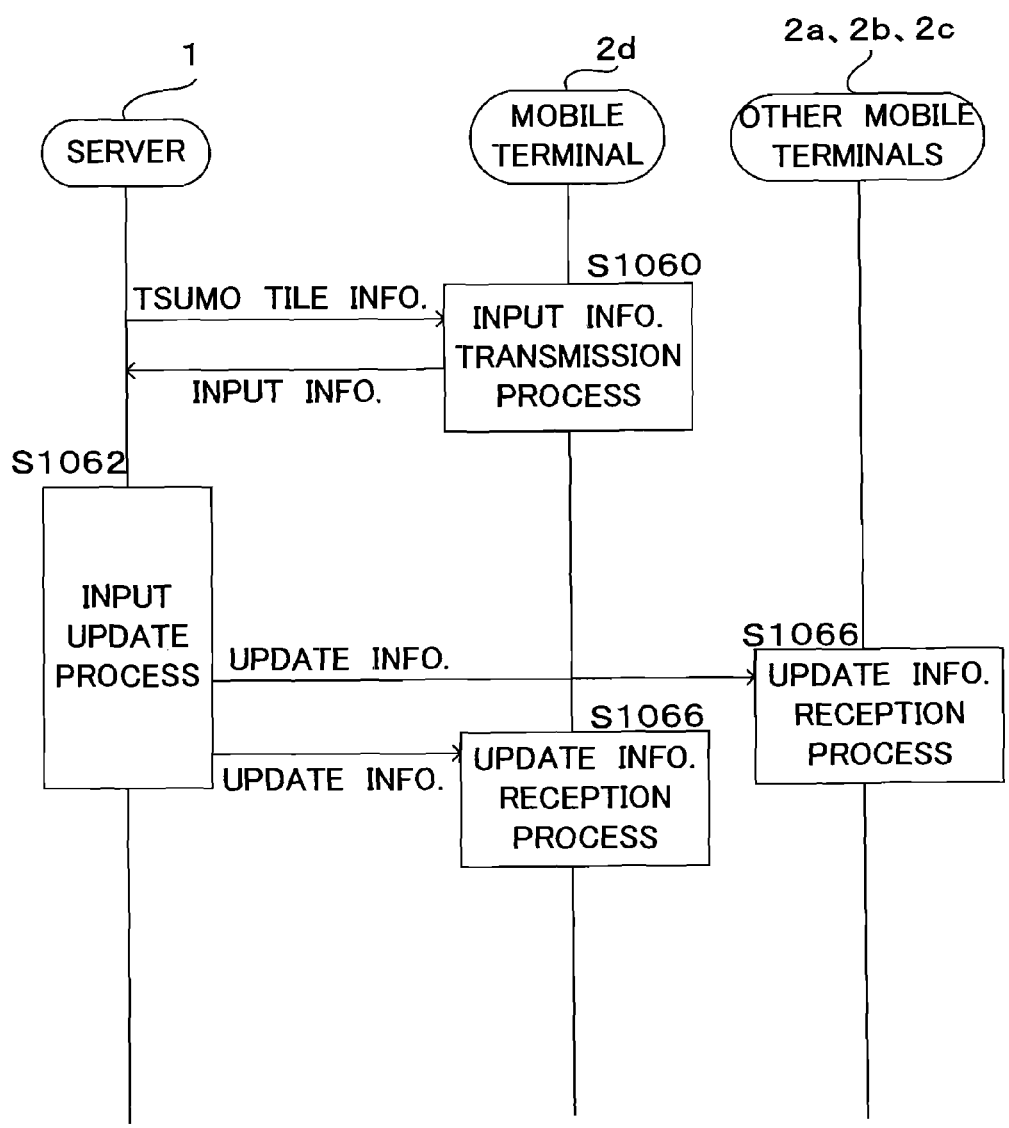
FIG. 16 is a sequence diagram showing procedures of processes of the server and the mobile terminal in the other embodiment.

A flow of the procedures in the case that the turn for the player PD operating the mobile terminal 2d has come and the player PD performs the input operation will be described in reference to a sequence diagram shown in FIG. 16. In input information transmission process at step S1060, input information about the input operation is transmitted from the mobile terminal 2d to the server 1. The server 1 having received the input information, at step S1062, updates the play information 16 of the player PD according to the input information. The server 1 transmits to each mobile terminal 2, update information for updating the game screen 30 displayed at each mobile terminal, responding to the update.

Thereby, the server control unit 12' functions as the input operation update device. In the update information, information can be set so that all of the hand of tiles information are displayed on the screen 21 of the mobile terminal 2d and only discard tile information is displayed on the screen 21 of each of the other mobile terminals 2a, 2b, 2c. At each mobile terminal 2 which has received the update information the game screen 30 is updated in accordance with the update information at step S1066 as the update information reception process.

Figure 17:
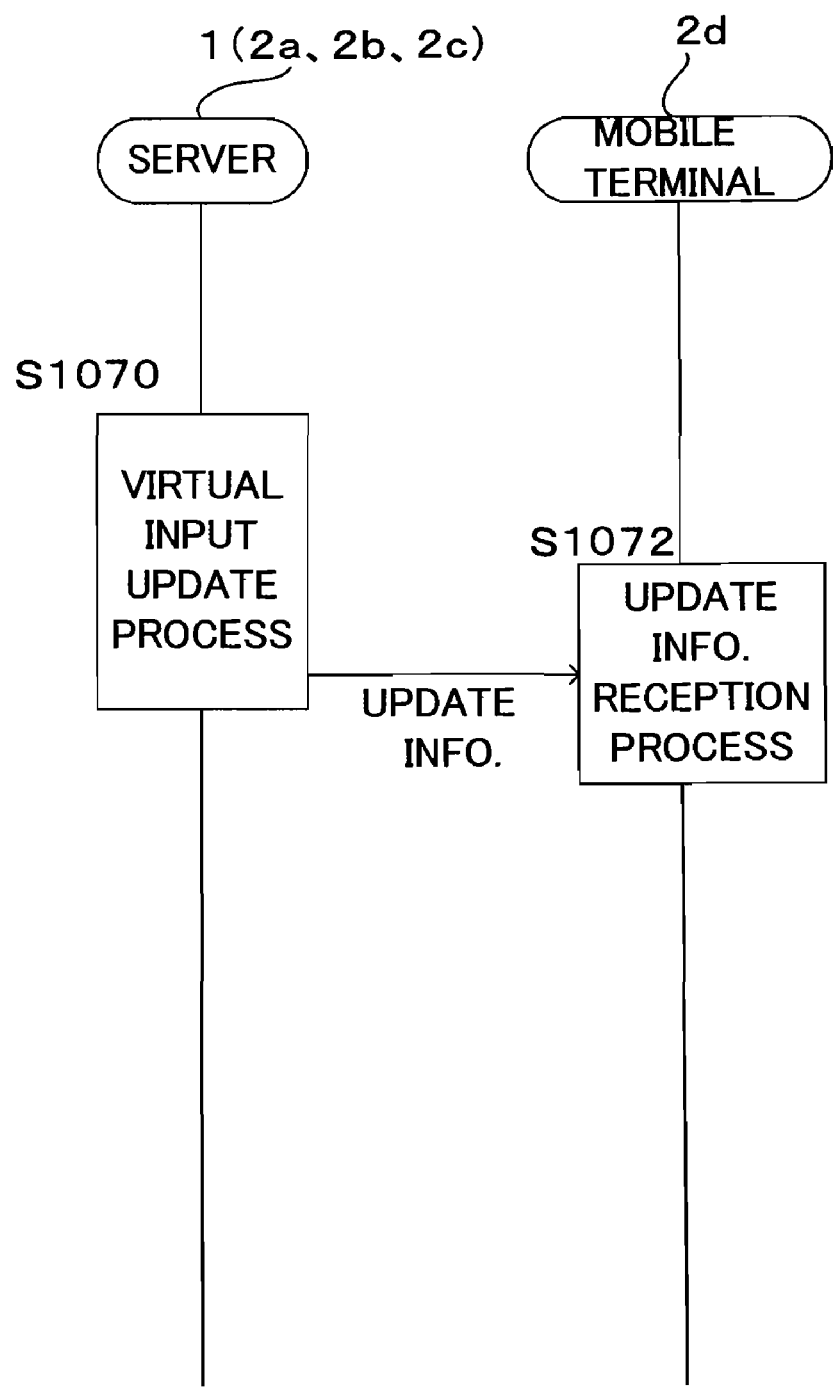
FIG. 17 is a sequence diagram showing a procedure of processes of the server and the mobile terminal in a case where the virtual player is set in the other embodiment.

In the case that the mobile terminal 2d is the error terminal 2d, after the communication recovery of the error terminal 2d, the server 1 functions as the virtual players acting as the players PA, PB, PC of the other terminals 2a, 2b, 2c. The procedures in the case that the turn to perform the input operation for the player PA set as the virtual player has come will be described in reference to the sequence diagram shown in FIG. 17. The server 1 implements the virtual input operation process at step S1070. In the virtual input operation process, when the Tsumo tile information is determined in the server 1, the server control unit 24' of the server 1 determines the virtual input operation based on the Tsumo tile information and the play information 16 of the player PA, updates the play information 16 of the player PA in accordance with the determined virtual input operation, and transmits to the mobile terminal 2d, the update information for displaying the game screen 30 according to the update on the screen 21 of the mobile terminal 2d.

Thereby, the server control unit 12' functions as the virtual input update device. At the moment of determining the virtual input operation, by referring to the play history information in the play information 16 of the player PA, the virtual input operation according to the play history information can be determined. At the mobile terminal 2d which has received the update information, update information process is implemented at step S1072. In the update information process, as mentioned above, the game screen 30 is updated based on the update information. In the case that the turn of input operation is the player PD's, the processes similar to the case that the virtual player is not set are implemented. However, it is enough that the update information is transmitted only to the mobile terminal 2d.

Figure 18:
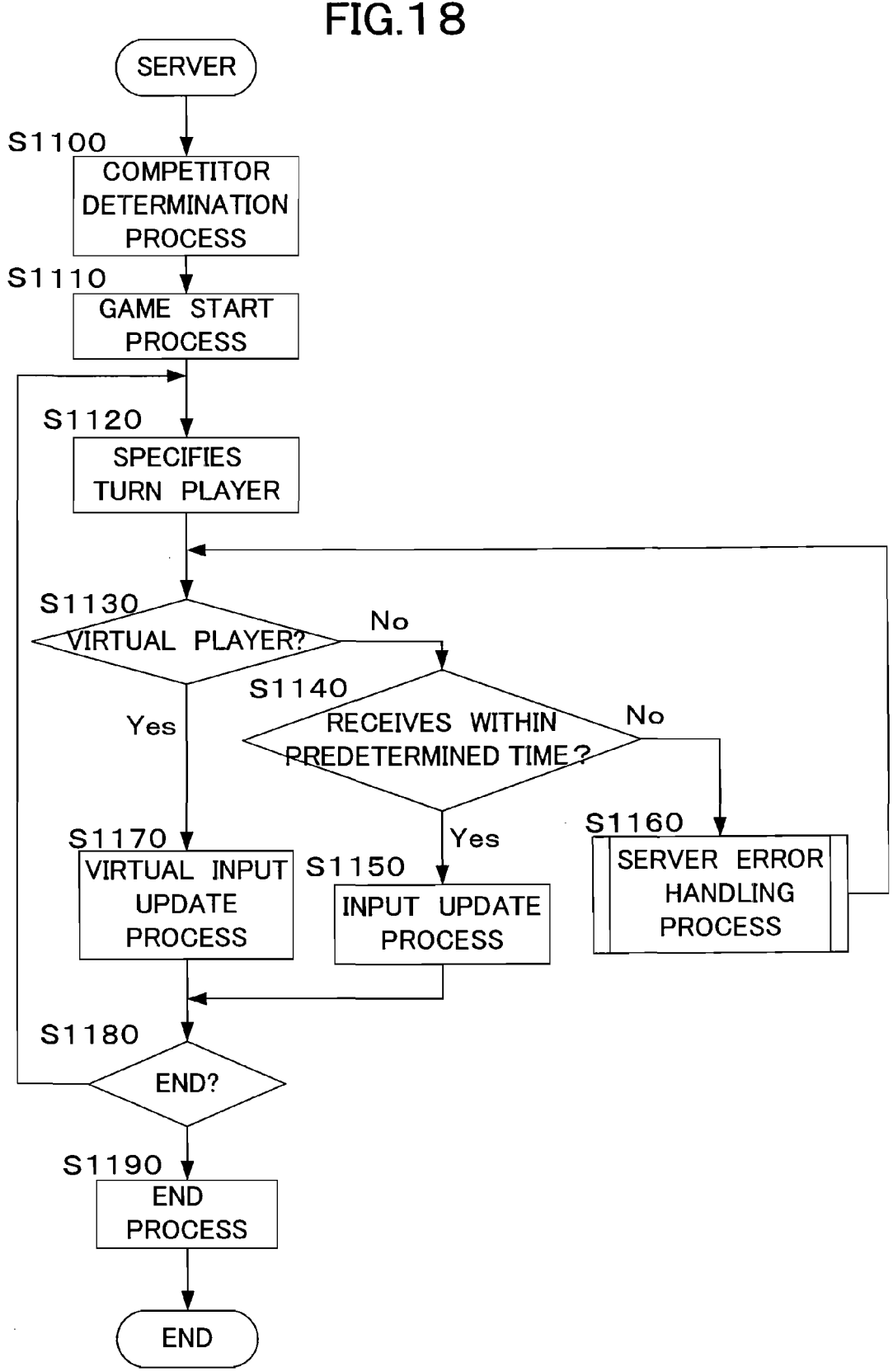
FIG. 18 is a flow chart showing a flow of processes implemented at the server in the other embodiment.

The processes implemented at the server 1 in the embodiment will be described in accordance with flow charts shown in FIG. 18 and FIG. 19. Each process being described hereinafter is controlled by the server control unit 24'. The competitor determination process of step S1100 and the game start process of step S1110 are similar to the processes in the first embodiment. At step S1120 the turn player is specified. Next, it is determined whether the specified player is the virtual player or not at step S1130. In the case that it is determined that the turn player is not the virtual player, the procedure goes to step S1140 to wait the input information from any one of the mobile terminals 2.

At step S1140, the Tsumo tile information is transmitted to the mobile terminal 2 of the specified player P and it is determined whether the input information has been received within a predetermined time or not. In the case that it is determined that the input information has been received, the input update process is implemented at step S1150 and the procedure goes to step S1180. In the case that it is determined the input information has not been received within the predetermined time at step S1140, as it is presumed that the error terminal occurs, the procedure goes to step S1160 to implement a server error handling process. In the server error handling process, a virtual player is set. The details of the sever error handling process will be described later. After the server error handling process, the procedure returns to step S1130.

In the case where it is determined that the specified player is the virtual player at step S1130, the procedure goes to step S1170 to determine the Tsumo tile information for the virtual player and implement the above mentioned virtual input update process. After the input update process of step S1150 or after the virtual input update process of step 1170, it is determined whether the game get ended or not at step S1180. In the case that it is determined that the game gets ended, the procedure goes to step S1190 to implement the end process to end the game. In the case that it is determined that the game does not get ended at step S1180, the procedure returns to step S1120 to specify the next turn player. The process for determination whether the game gets ended or not and the end process are similar to the processes in the above embodiment.

The server error handling process in this embodiment will be described in accordance with a flow chart shown in FIG. 19, as referring the case that the input information of the player PD has not been received within the predetermined time, that is, the case that the mobile terminal 2d is presumed to be an error terminal. First, as the process for continuing the game, information for continuation generating process is implemented at step S2000. In the information for continuation generating process, as shown in FIG. 20A, the game information for continuation 131' is generated as the information for continuation from the game information 13 at the moment when it is determined that the error terminal has occurred. In the game information for continuation 131', the terminal information of the player PD corresponding to the error terminal 2d is set to be "the server".

After generating the game information for continuation 131', the procedure returns to the step S1130. As the turn player P is the player PD, the virtual input update process is implemented with respect to the virtual input operation of the virtual player PD'. Thereby, the game where the player PD of the error terminal 2d is set to be the virtual player PD' can be continued by the players PA, PB, PC. In the game which is continued by the players PA, PB, PC except the player PD, the virtual input update process and the input update process are implemented by treating the game information for continuation 131' as the game information. Thereby, the server control unit 12' functions as the game continuation device.

On the other hand, as a process for restarting the game, it is further determined at step 2010 whether the error terminal 2d has been reconnected during a predetermined time. In the case that it is determined that the error terminal 2d has not been reconnected, the procedure goes to step S2020 to implement withdraw process in which it is presumed the player PD has withdrawn, and the game gets ended. In the case that it is determined that the error terminal 2d has been reconnected, the procedure goes to step S2030 to implement information for restart generating process. In the information for restart generating process, as shown in FIG. 20B, a game information for restart 132' is generated as the information for restart from the game information 13 at the moment when it is determined that the error terminal has occurred.

The game information for restart 132' is the same as the game information 13 at the moment of determination, except that the terminal information of the players PA, PB, PC corresponding to the mobile terminals 2a, 2b, 2c other than the error terminal 2a is set to be "the server". Thereby, the update information is transmitted from the server only to the error terminal 2d. After generating the information for continuation the procedure returns to step 1130. As mentioned above, as in this situation the turn player is the player PD, the server gets into a situation of waiting the input information of the player PD. Thereby, the player PD can restart the game with the virtual players PA', PB, PC'. In the game restarted for the player PD, the virtual input update process and the input update process are implemented by using the game information for restart 132' as the game information. As mentioned above, the server control unit 12' functions as the server restart device.

By step S1120 and step S1180, the server control unit 12' of the server 1 functions as the game progress device. Moreover, at the mobile terminal 2 in this embodiment, the input operation information transmission process and the update information reception process are implemented before as well as after the occurrence of the error terminal.

The present invention is not limited to the above mentioned embodiment, but can be implemented in various embodiments. For example, the process at the mobile terminal for detecting the communication error of the mobile terminal itself can be implemented at the moment of transmission, and the processes in the flow charts of the present embodiment can be changed as long as the present invention can be completed. Moreover, in the first embodiment, for example, if the hand of tiles information corresponding to the player of error terminal is stored in nonvolatile storage medium, it is possible that the play information 16 of the real player of error terminal is not included in the information for restart.

Further, more than one error terminals can occur. In the case where the mobile terminal 2a becomes an error terminal after the mobile terminal 2d, the game information for restarting the game is generated from the game information used for the game progressed by the players PA, PB, PC, and the game is restarted for the player PA. Moreover, the game information for continuation is generated from the same game information, and the game is continued for the players PB, PC except the player PA.

Figure 21:
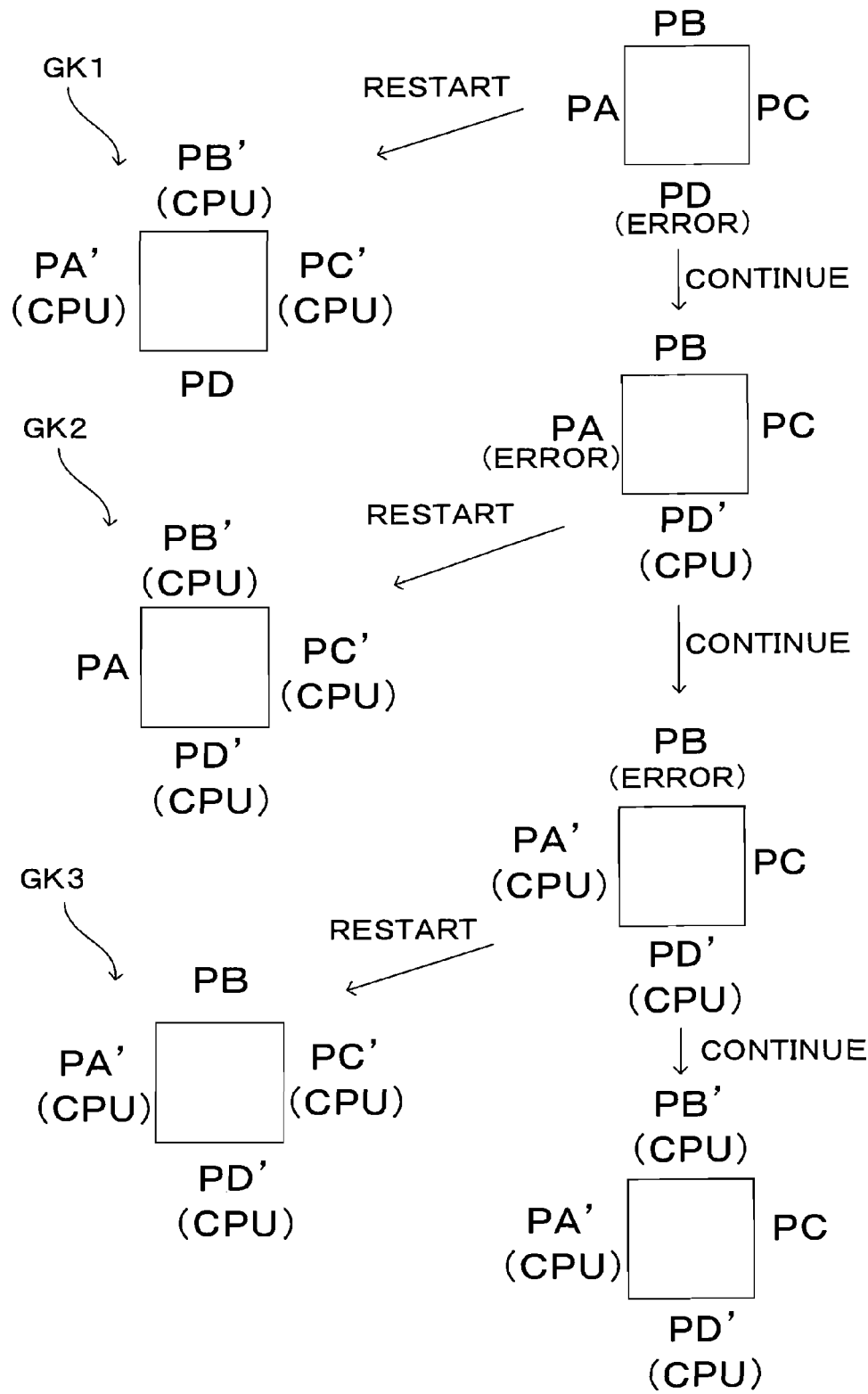
FIG. 21 is a conceptual diagram showing the situation of the case where communication error occurs to each of three players and the game is restarted for each of the players.

Moreover, when the mobile terminal 2b becomes an error terminal, the game is restarted for the player PB in the same way. As mentioned above, according to the present invention, a new game world for restarting the game is provided to each error terminal. It is shown in FIG. 21 that the mobile terminal 2d, the mobile terminal 2a and the mobile terminal 2b become an error terminal in this order, and a new game world GK1, GK2, GK3 are provided to the players PD, PA, PB respectively.

In the information for restart and the information for continuation, only the hand of tiles information at the moment of communication cut can be included. In this case, the virtual input operation of the virtual player can be determined by the predetermined procedures, or an input operation can be determined in advance as the virtual input operation. The play history information is stored as the play information in the situation information storage device, and the hand of tiles information can be obtained from the information stored at the moment of transmitting the information for restart and the information for continuation. The game of the present invention can be any games as long as a game is played with plural people. For example, a tramp game such as porker and bridge, Japanese chess, go, or chess can be the game.

The invention claimed is:

1. A game system comprising:
a server; and
a plurality of terminals, each capable of transmitting and receiving data with the server,
in which a game is implemented via the server among a plurality of players each corresponding to each of the terminals by input operation of the player to the corresponding terminal,
wherein the server has:
a situation information storage device storing situation information indicating situation in the game of each player;
a situation-information update device obtaining update information for updating the situation information of each player from each terminal, and updating the situation information by the update information, as well as transmitting the obtained update information to the plurality of terminals except a terminal that is a transmitter of the obtained update information; and
a server error handling device implementing predetermined processes, when it is determined that an error terminal from which communication is cut has occurred among the terminals;

the server error handling device having:
a game continuation device continuing the game from a moment of the determination that communication is cut from the error terminal based on the situation information of each player from each terminal except the error terminal; and
a server restart device, when communication with the error terminal recovers within a predetermined time, transmitting to the error terminal information for restart including the situation information of each player corresponding to at least other terminals at the moment of the determination, setting the situation information of each player at the moment of the determination as situation information for restart and progressing the game by obtaining the update information only from the error terminal to update the situation information for restart corresponding to the update information obtained; and
each of the terminals has:
an input operation device updating the situation information of the player corresponding to the terminal itself which the terminal itself stores, in accordance with the input operation by the player, and transmitting the update information of the update to the server;
a virtual input operation device, in a case where at lease one virtual player is determined, determining a virtual input operation as the input operation by each virtual player in the game, updating the situation information of a virtual player in accordance with the virtual input operation, and transmitting the update information of the update to the server;
a situation display device displaying on a screen situation of each player in accordance with the situation information of the player corresponding to the terminal itself and the update information of the players corresponding to other terminals; and a
terminal restart device, in a case where the terminal itself is the error terminal, setting the situation information for restart of each of the players corresponding to the other terminals by using the information for restart obtained from the server after the communication recovers, and restarting the game;
the terminal restart device, using the situation information for restart as the situation, activating, as well as the input operation device and the situation display device, the virtual input operation device by setting the virtual player as each of the players corresponding to the other terminals.

2. The game system according to claim 1, wherein the information for restart includes the situation information of the player corresponding to the error terminal, and the terminal restart device sets the situation information of the player by the information for restart.

3. The game system according to claim 1, wherein the situation information storage device stores a history of the update information as play history information for each player, the information for restart includes the play history information of each player, and the terminal restart device determines the virtual input operation in accordance with the play history information.

4. The game system according to claim 1, wherein
a turn of input operation of each player in the game is determined by a predetermined method,
the server error handling device has
a server error determination device, in a case where the update information from the player whose turn of input operation comes is not received during a predetermined time determining that the terminal corresponding to the player is the error terminal.

5. The game system according to claim 1, wherein the game continuation device specifies one of the terminals except the error terminal, refers to the situation information storage device to transmit to the specified terminal as information for continuation, the situation information of the player corresponding to the error terminal at the moment of the determination, and obtains the situation information of the player corresponding to the error terminal from the specified terminal, the terminal, when receiving the information for continuation, sets the situation information included in the information for continuation to be the situation information of the virtual player instead of the player corresponding to the error terminal, and sets the virtual input operation as the input operation of the player corresponding to the error terminal, for activating the virtual input operation device.

6. A server of a game system including the server and a plurality of terminals, each capable of transmitting and receiving data with the server, in which a game is implemented via the server among a plurality of players each corresponding to each of the terminals by input operation of the player to the corresponding terminal, and at the terminal when a virtual player is set as the player corresponding to one of the other terminals, the virtual player is possible to join the game as the player of the one of the other terminals, wherein the server comprises:
a situation information storage device storing situation information indicating situation in the game of each player;
a situation-information update device obtaining update information for updating the situation information of each player from each terminal, and updating the situation information by the update information, as well as transmitting the obtained update information to the plurality of terminals except a terminal that is a transmitter of the obtained update information; and
a server error handling device implementing predetermined processes, when it is determined that an error terminal from which communication is cut has occurred among the terminals;
the server error handling device having:
a game continuation device continuing the game from a moment of the determination that communication is cut from the error terminal based on the situation information of each player from each terminal except the error terminal; and
a server restart device, when communication with the error terminal recovers within a predetermined time, transmitting to the error terminal information for restart including the situation information of each player corresponding to at least other terminals at the moment of the determination, setting the situation information of each player at the moment of the determination as situation information for restart and progressing the game by obtaining the update information only from the error terminal to update the situation information for restart corresponding to the update information obtained.

7. A terminal of a game system including a server and a plurality of terminals, each capable of transmitting and receiving data with the server, in which a game is implemented via the server among a plurality of players each corresponding to each of the terminals by input operation of the player to the corresponding terminal, and the server implements following processes: storing situation information indicating situation in the game of each player corresponding to each of the terminals; obtaining update information for updating of the situation information of each player from each terminal, updating the situation information by the update information, as well as transmitting the obtained update information to the plurality of terminals except a terminal which is a transmitter of the obtained update information; after it is determined that an error terminal from which communication is cut has occurred among the terminals, when communication with the error terminal recovers within a predetermined time, transmitting to the error terminal information for restart including the situation information of each player corresponding to at least other terminals at the moment of the determination when communication with the error terminal does not recover within the predetermined time, continuing the game from a moment of the determination that communication is cut from the error terminal based on the situation information of each player from each terminal except the error terminal, and, setting the situation information of each player at the moment of the determination as situation information for restart and progressing the game by obtaining the update information only from the error terminal to update the situation information for restart corresponding to the update information obtained, wherein the terminal has:

an input operation device updating the situation information of the player corresponding to the terminal itself which the terminal itself stores, in accordance with the input operation by the player, and update information of the update transmitting to the server;
a virtual input operation device, in a case where at lease one virtual player is determined, determining a virtual input operation as the input operation by each virtual player in the game, updating the situation information of a virtual player in accordance with the virtual input operation, and transmitting update information of the update to the server;
a situation display device displaying on a screen situation of each player in accordance with the situation information of the player corresponding to the terminal itself and the update information of the players corresponding to other terminals; and
a terminal restart device, in a case where the terminal itself is an error terminal where the communication was cut, when receiving from the server the information for restart after the communication recovers, setting the situation information for restart of each of the players corresponding to the other terminals by using the information for restart received from the server, and restarting the game;
the terminal restart device, by using the situation information for restart as the situation information, activating, as well as the input operation device and the situation display device, the virtual input operation device by setting the virtual players as each of the players corresponding to the other terminals.

8. A game system comprising:
a server; and
a plurality of terminals, each capable of transmitting and receiving data with the server,
in which a game is implemented via the server among a plurality of players each corresponding to each of the terminals by input operation of the player to the corresponding terminal,
wherein the server has:
a situation information storage device storing situation information indicating situation in the game of each player;
a game progress device progressing the game based on the situation information of each player;
an input update device, when obtaining input information of input operation of each player from each terminal, updating the situation information by the input information, and transmitting update information for updating to each terminal; and a virtual input update device, in a case where at least one virtual player is set, determining virtual input operation instead of the input operation in the game of each virtual player, updating the situation information of the virtual player in accordance with the virtual input information, and transmitting update information to each terminal;

a server error handling device implementing predetermined processes, when it is determined that an error terminal from which communication is cut has occurred among the terminals;

the server error handling device having:

a game continuation device continuing the game from a moment of the determination that communication is cut from the error terminal based on the situation information of each player from each terminal except the error terminal; and a server restart device, when communication recovery with the error terminal recovers within a predetermined time, setting the virtual player as the player corresponding to one of the terminals except the error terminal to activate the virtual input operation device, and progressing the game only by communication with the error terminal; and the terminal has:

an input information transmitting device transmitting to the server the input information of input operation of the player corresponding to the terminal itself; and a situation display device displaying on a screen situation of each player in accordance with the update information obtained from the server.

9. The game system according to claim 2, wherein the situation information storage device stores a history of the update information as play history information for each player, the information for restart includes the play history information of each player, and the terminal restart device determines the virtual input operation in accordance with the play history information.

10. The game system according to claim 2, wherein a turn of input operation of each player in the game is determined by a predetermined method, the server error handling device has a server error determination device, in a case where the update information from the player whose turn of input operation comes is not received during a predetermined time determining that the terminal corresponding to the player is the error terminal.

11. The game system according to claim 3, wherein a turn of input operation of each player in the game is determined by a predetermined method, the server error handling device has a server error determination device, in a case where the update information from the player whose turn of input operation comes is not received during a predetermined time determining that the terminal corresponding to the player is the error terminal.

12. The game system according to claim 9, wherein a turn of input operation of each player in the game is determined by a predetermined method, the server error handling device has a server error determination device, in a case where the update information from the player whose turn of input operation comes is not received during a predetermined time determining that the terminal corresponding to the player is the error terminal.

13. The game system according to claim 2, wherein the game continuation device specifies one of the terminals except the error terminal, refers to the situation information storage device to transmit to the specified terminal, information for continuation, the situation information of the player corresponding to the error terminal at the moment of the determination, and obtains the situation information of the player corresponding to the error terminal from the specified terminal, the terminal, when receiving the information for continuation, sets the situation information included in the information for continuation to be the situation information of the virtual player instead of the player corresponding to the error terminal, and sets the virtual input operation as the input operation of the player corresponding to the error terminal, for activating the virtual input operation device.

14. The game system according to claim 3, wherein the game continuation device specifies one of the terminals except the error terminal, refers to the situation information storage device to transmit to the specified terminal, as information for continuation, the situation information of the player corresponding to the error terminal at the moment of the determination, and obtains the situation information of the player corresponding to the error terminal from the specified terminal, the terminal, when receiving the information for continuation, sets the situation information included in the information for continuation to be the situation information of the virtual player instead of the player corresponding to the error terminal, and sets the virtual input operation as the input operation of the player corresponding to the error terminal, for activating the virtual input operation device.

15. The game system according to claim 9, wherein the game continuation device specifies one of the terminals except the error terminal, refers to the situation information storage device to transmit to the specified terminal, as information for continuation, the situation information of the player corresponding to the error terminal at the moment of the determination, and obtains the situation information of the player corresponding to the error terminal from the specified terminal, the terminal, when receiving the information for continuation, sets the situation information included in the information for continuation to be the situation information of the virtual player instead of the player corresponding to the error terminal, and sets the virtual input operation as the input operation of the player corresponding to the error terminal, for activating the virtual input operation device.

16. The game system according to claim 4, wherein the game continuation device specifies one of the terminals except the error terminal, refers to the situation information storage device to transmit to the specified terminal, as information for continuation, the situation information of the player corresponding to the error terminal at the moment of the determination, and obtains the situation information of the player corresponding to the error terminal from the specified terminal, the terminal, when receiving the information for continuation, sets the situation information included in the information for continuation to be the situation information of the virtual player instead of the player corresponding to the error terminal, and sets the virtual input operation as the input operation of the player corresponding to the error terminal, for activating the virtual input operation device.

17. The game system according to claim 10, wherein the game continuation device specifies one of the terminals except the error terminal, refers to the situation information storage device to transmit to the specified terminal, as information for continuation, the situation information of the player corresponding to the error terminal at the moment of the determination, and obtains the situation information of the player corresponding to the error terminal from the specified terminal, the terminal, when receiving the information for continuation, sets the situation information included in the information for continuation to be the situation information of the virtual player instead of the player corresponding to the error terminal, and sets the virtual input operation as the input operation of the player corresponding to the error terminal, for activating the virtual input operation device.

18. The game system according to claim 11, wherein the game continuation device specifies one of the terminals except the error terminal, refers to the situation information storage device to transmit to the specified terminal, as information for continuation, the situation information of the player corresponding to the error terminal at the moment of the determination, and obtains the situation information of the player corresponding to the error terminal from the specified terminal, the terminal, when receiving the information for continuation, sets the situation information included in the information for continuation to be the situation information of the virtual player instead of the player corresponding to the error terminal, and sets the virtual input operation as the input operation of the player corresponding to the error terminal, for activating the virtual input operation device.

19. The game system according to claim 12, wherein the game continuation device specifies one of the terminals except the error terminal, refers to the situation information storage device to transmit to the specified terminal, as information for continuation, the situation information of the player corresponding to the error terminal at the moment of the determination, and obtains the situation information of the player corresponding to the error terminal from the specified terminal, the terminal, when receiving the information for continuation, sets the situation information included in the information for continuation to be the situation information of the virtual player instead of the player corresponding to the error terminal, and sets the virtual input operation as the input operation of the player corresponding to the error terminal, for activating the virtual input operation device.

* * * * *